(12) United States Patent
Viswanathan et al.

(10) Patent No.: US 11,325,492 B2
(45) Date of Patent: May 10, 2022

(54) METHOD FOR DETERMINING OPTIMAL PLACEMENT OF ELECTRIC VEHICLE CHARGERS

(71) Applicant: Carnegie Mellon University, Pittsburgh, PA (US)

(72) Inventors: Venkatasubramanian Viswanathan, Pittsburgh, PA (US); Matthew Guttenberg, Pittsburgh, PA (US); Shashank Sripad, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 5 days.

(21) Appl. No.: 17/066,755

(22) Filed: Oct. 9, 2020

(65) Prior Publication Data

US 2021/0107372 A1  Apr. 15, 2021

Related U.S. Application Data

(60) Provisional application No. 62/973,541, filed on Oct. 9, 2019.

(51) Int. Cl.
| | |
|---|---|
| *B60L 53/62* | (2019.01) |
| *B60L 53/66* | (2019.01) |
| *G01C 21/34* | (2006.01) |
| *B60L 58/13* | (2019.01) |
| *B60L 53/30* | (2019.01) |

(52) U.S. Cl.
CPC .............. *B60L 53/62* (2019.02); *B60L 53/30* (2019.02); *B60L 53/66* (2019.02); *B60L 58/13* (2019.02); *G01C 21/3469* (2013.01)

(58) Field of Classification Search
CPC .......... B60L 53/62; B60L 53/66; B60L 58/13; B60L 53/30; G01C 21/3469
USPC ........................................................ 320/109
See application file for complete search history.

(56) References Cited

U.S. PATENT DOCUMENTS

| | | | | |
|---|---|---|---|---|
| 2016/0118835 | A1* | 4/2016 | Desai | H02J 7/025 |
| | | | | 320/108 |
| 2019/0318419 | A1* | 10/2019 | VanderZanden | G06Q 30/0645 |
| 2020/0108732 | A1* | 4/2020 | Northrop | G06N 3/088 |
| 2020/0310424 | A1* | 10/2020 | Schmidt | G06Q 10/20 |
| 2020/0338999 | A1* | 10/2020 | Press | H04W 4/38 |
| 2020/0376927 | A1* | 12/2020 | Rajaie | B60H 1/00885 |
| 2021/0108937 | A1* | 4/2021 | Fox | G01C 21/3469 |
| 2021/0181762 | A1* | 6/2021 | Zhao | G05D 1/0088 |

(Continued)

FOREIGN PATENT DOCUMENTS

| | | | | | |
|---|---|---|---|---|---|
| DE | 102019108794 | A1 * | 10/2019 | | B60L 58/12 |
| KR | 20210057919 | A  * | 5/2021 | | |
| WO | WO-2019023324 | A1 * | 1/2019 | | G01C 21/3469 |

*Primary Examiner* — Suresh Memula
(74) *Attorney, Agent, or Firm* — Kacvinsky Daisak Bluni PLLC

(57) ABSTRACT

A method for the efficient placement of electric vehicle chargers in a target area couples vehicle dynamics and battery dynamics modeling with environmental factors to accurately incorporate the impact that the environment has on the range of the battery into the placement of the chargers by simulating trips of fleets of electric vehicles. The vehicles can be of various types, for example, motorcycles, cars, trucks or aircraft, and will each have their battery state of charge monitored as they traverse a simulated trip through the target area.

31 Claims, 13 Drawing Sheets
(11 of 13 Drawing Sheet(s) Filed in Color)

(56) References Cited

U.S. PATENT DOCUMENTS

| | | | |
|---|---|---|---|
| 2021/0213846 A1* | 7/2021 | Sun | G07F 15/005 |
| 2021/0276595 A1* | 9/2021 | Casas | G08G 1/202 |
| 2021/0291687 A1* | 9/2021 | Ferguson | B60L 53/62 |
| 2021/0295610 A1* | 9/2021 | Lee | B60L 53/67 |
| 2021/0380013 A1* | 12/2021 | Moszynski | H02J 7/00032 |

* cited by examiner

METHOD FOR DETERMINING OPTIMAL PLACEMENT OF ELECTRIC VEHICLE CHARGERS

RELATED APPLICATIONS

This application claims the benefit of U.S. Provisional Patent Application Ser. No. 62/973,541, filed Oct. 9, 2019, the contents of which are incorporated herein in their entirety.

BACKGROUND OF THE INVENTION

The electrification of the transportation industry and growing adoption of electric vehicles (EVs) has precipitated a concurrent increasing demand for charging infrastructure. Efficient and optimal deployment this infrastructure requires models that can adequately estimate the performance of the electric vehicle fleet under real scenarios. While there has been significant work on estimating energy-consumption for realistic drive profiles, there is a need to systematically incorporate environmental conditions (e.g. wind, elevation) along a route for enabling efficient and optimal charger deployment.

To efficiently and optimally place chargers, several factors must be considered including, for example, the range of the EVs and the cost of the infrastructure. Some existing models used to solve this problem include a grid-based approach and an agent-based approach.

The grid-based approach places chargers at constant distances from each other, effectively building a grid of chargers such that any EV is able to go to a charger wherever and whenever it may be required. While this method addresses the demand consideration for charger placement, it is very expensive as it will deploy far more chargers than are actually needed, resulting in some chargers seeing little to no utilization.

The agent-based approach, on the other hand, places chargers based on the demand generated using a simulation of several individual agents. This demand is based on a cost function that uses numerous factors, for example, social influence, fuel cost, etc., which allows this method to place chargers in a more cost-efficient manner while also meeting the demand of the EV fleet.

One issue that persists with existing methods is that they treat the battery as a black box. As a result, the respective models for the EV will yield a single value for the range rather than a dynamic range based on the conditions under which the EV's operate and under which the battery is utilized.

The range of the EV is dynamic based on the conditions under which the battery is operating, thus the single range assumption used in the previous models fails to place chargers in a way that will sufficiently meet the demand of the EVs under all conditions.

SUMMARY OF THE INVENTION

To address the deficiencies of the existing models, a new method has been developed and is disclosed herein which will utilize the power of high-performance computing to simulate thousands of individual vehicles traveling through various conditions such as weather and traffic, all while calculating the depletion of the battery through the coupling of both vehicle and battery dynamics.

This will allow the method to place chargers that will meet the demand of the projected EV fleet under any condition while also minimizing the investment cost needed to do so.

The method provides a high-fidelity agent-based electric vehicle simulation framework which can also simulate fleets of electric vehicles, each recording their own performance, and provide fleet statistics that can be used to inform larger simulations such as charger deployment optimization. The method can simulate any electric vehicle, including but not limited electric cars, electric trucks, and electric aircraft, can use any battery model and can perform this analysis for any location.

In some embodiments, the invention can accurately incorporate the impact that the environment has on a range of an electric vehicle battery into a model to determine optimal placement of chargers by coupling vehicle dynamics and battery dynamics modeling, thereby properly satisfying the charging demand of an EV fleet.

In some embodiments, the invention utilizes a map of a target area to create a matrix representation upon which simulated vehicles can travel. Such vehicles can be of various types, including, for example, motorcycles, cars, trucks, electric aircraft, electric vertical take-off and landing (eVTOL) aircraft, etc. and each type of vehicle can have their own start and end locations generated on a map using either stochastic sampling or a biased pick based on known information about the location, for example, whether the location is a shopping mall, work center, residential area, etc.

In some embodiments, the invention includes methods that can route each vehicle through a map from a start location to and end location with highly accurate energy estimates for the trip. In some embodiments, the State of Charge (SoC) of the vehicle battery can be calculated using vehicle dynamics equations to calculate the power needed to travel the distance and then applying battery dynamics equations to calculate the resulting depletion of the battery accounting for environmental conditions.

In some embodiments, if the SoC of a vehicle gets below a set threshold, a vehicle can travel to the closest charger, otherwise it will continue on its trip. In some embodiments, by using Markov modeling, the trip generation for each vehicle can dynamically change, allowing the trips to include multiple stops across the target map.

In some embodiments, the invention can appropriately place chargers by keeping track of vehicles and their respective preferred charging locations. A high-performance computing cluster and parallel programming may be used to run several simulations of thousands of vehicles in parallel, with each simulation generating its own heat map for optimal charger placement.

In some embodiments, by gathering the distributions for each charging location for a given input condition set, the convergence of the charger placement can be tested. In some embodiments, the invention may include a method to develop the appropriate map data file for each location based on measured environmental conditions. For example, the invention may utilize Shapefiles measured from a locale along with measured data of the elevation, wind direction, wind speed and temperature to create a map data file that appropriately captures the dynamics of the target location. In some embodiments, the temporal aspect of the climate can also be captured by feeding the method the appropriate measured data from the respective time of year needed to capture the seasonal effects. Along with the environmental factors, the invention may also factor in characteristics of the vehicle, such as its drag coefficient, frontal area, etc., impact the overall energy used to move the vehicle, etc.

In some embodiments, the movement of the vehicle along the route can be accurately tracked by using representative vehicle drive cycles of the local area. The aforementioned factors may allow the invention to customize the charger placement to each target location based on its respective local conditions. The accurate calculation of the energy used by the vehicles in a trip can also be extend to areas outside of just charging such as estimate the real range an electric vehicle will have.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
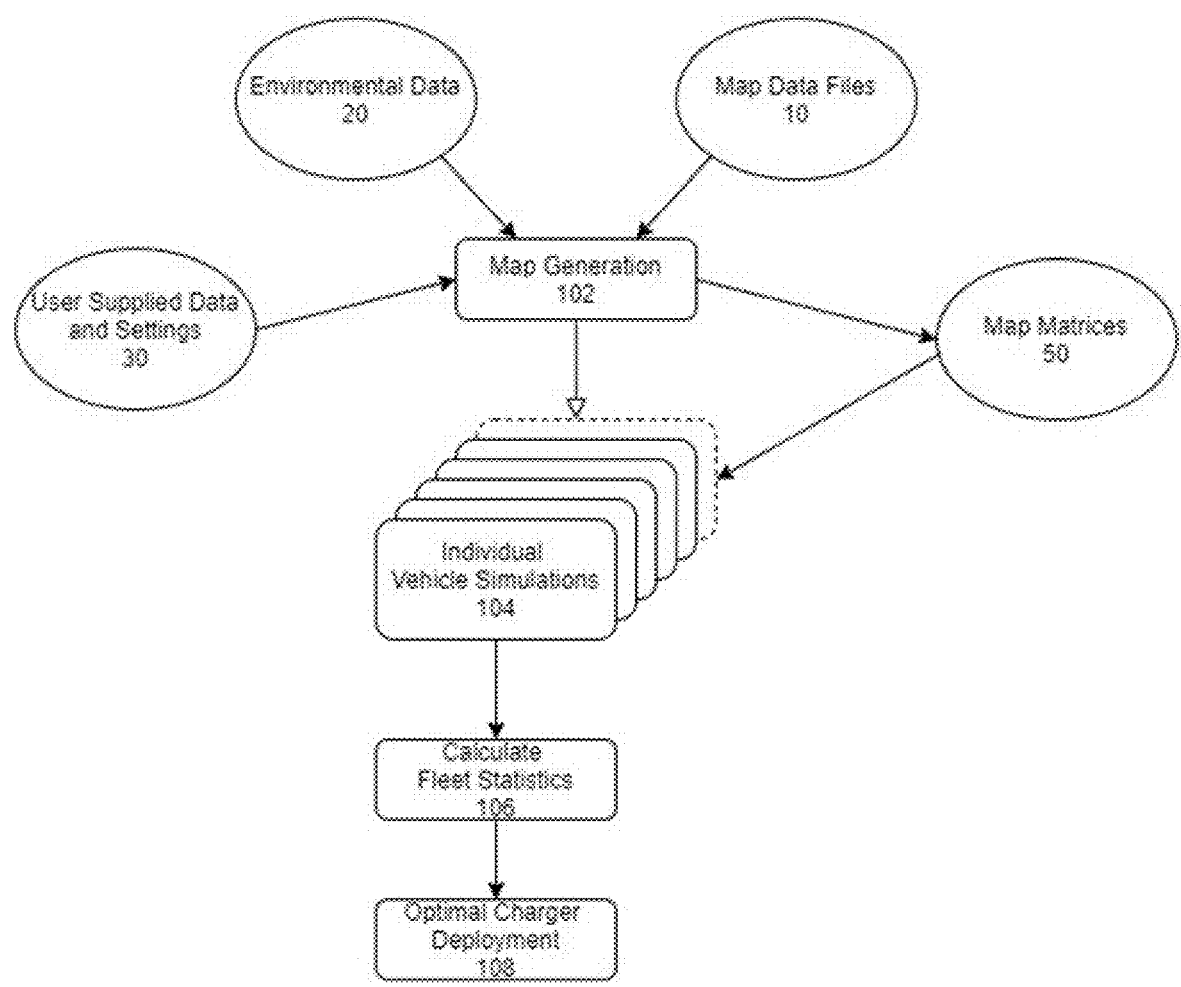
FIG. 1 is a flowchart showing the overall process to produce a recommendation regarding optimal charger deployment.

To meticulously simulate individual electric vehicles, and to efficiently and accurately extend the analysis to the fleet level scale and optimize the fleet level statistics to perform tasks such as charger placement, a complex system analysis known as Agent-Based Modeling (ABM) is employed. ABM was chosen for this analysis because of the capability to utilize the parallel processing to simulate multiple agents, each governed by a set of mathematical equations and rules and explore the dynamics outside of the reach the reach of just those equations. Each agent is governed by a set of vehicle dynamics and battery dynamics equations, each augmented by measured data, such as elevation and temperature, such that each agent emulates the behavior of an electric vehicle (EV) driving through the simulated area. Each agent from the ABM will provide information on its performance which will be used to determine the fleet statistics at the end of the simulation.

In the setup of ABM for this invention, the agents do not interact with each other. This means that some of more sophisticated dynamics will not be simulated in this system, such as traffic-based routing, however the agents are therefore individual entities that can be simulated entirely in parallel. Thus, through the use of parallel computing paradigms, the computational cost of the ABM is drastically reduced, allowing for it to be seamlessly integrated into the optimization schemes using the fleet scale data, such as charger placement. In addition, even simple ABMs have the ability to simulate the complex behavior of real systems and provide important information about the dynamics that govern these systems.

The aforementioned ABM simulation forms the heart of the software portion of the invention, which is described in detail herein. The main advantage of the invention over other charger placement methods is its ability to consider the battery as a dynamic system while also incorporating other factors, including, for example, the impact of environmental factors and conditions to determine the optimal location for the chargers. Other prior art algorithms ignore this detail and treat the electric vehicles as having a fixed range on their respective battery packs. This, however, is not the case and has the potential to cause those algorithms to misplace chargers where vehicles are incapable of reaching the chargers before the battery is drained or placing too many chargers within the target area.

Through the coupled dynamics simulation previously described, the invention is able to account for the variable range in the battery pack of an electric vehicle, including environmental impacts such as temperature, elevation and wind, and place chargers that will properly meet the demand of the electric vehicle fleet within the target area. In addition, the invention is built as a modular algorithm. This means that it is capable of performing high-fidelity simulations on any electric vehicle, including, but not limited to, electric cars, electric motorcycles, 3-wheeled vehicles (i.e., tuk-tuks), electric trucks, electric aircraft, etc., and estimating the corresponding fleet dynamics as well as placing the corresponding chargers/skyports.

Map Generation

With reference to FIG. 1, the first step in the method is map generation 102, that converts measured data from the target area into a form which the ABM simulation can utilize. This step will have some variation depending on the mode of transportation that is being evaluated, however the methodologies employed within the algorithm and the end result will be the same throughout all simulations. Thus, the following description of this step within the method provides both a general overview of its implementation as well as some of the particular steps that are taken to simulate personal electric vehicles such as cars or pickup trucks.

The start of the map generation portion 102 of the method is a conversion of a freely accessible geospatial map data file 10 describing the target area into a series of RGB matrices indicating the presence of a road and other data, for example, the expected traffic on the road. The series of map matrices are shown as map matrix 50 in FIG. 1.

In one embodiment, the geospatial file 10 used in this analysis is known as a shapefile. Shapefiles are the most widely used format for storing information, such as road networks, using a variety of vectors, polylines and polygons to describe the encoded feature. In addition, these files will often include different tags or descriptors for each of the geometric shapes provided to help identify the object, such as the type of road that the object is representing. The wide availability of shapefiles fits well with this method as it allows for any location, regardless of scale, to be simulated, providing that a shapefile which adequately describes the location exists. The sources for the shapefiles can vary depending on a country-by-country basis, but for locations within the United States, shapefiles are obtainable from the United States Census Bureau.

Once the shapefile is imported, the first step is to scan through the polylines and determine the maximum and minimum values for both the latitude and the longitude. These values define the bounding box for the area of the simulation and thus they will occupy the first and last row for the latitude matrix as well as the first and last column for the longitude matrix created in map generation step 102. This sets the latitude and longitude matrices up in a mesh grid pattern such that each element combination from the two matrices defines the latitude and longitude coordinates on the map. To determine the grid values in between, and ultimately the size of the matrices, the user is asked to input the desired discretization for both the latitude and longitude in meters. This user-supplied setting is part of the user-supplied data and settings shown as 30 in FIG. 1. The following formula is then used to convert from the desired discretization to the corresponding latitude or longitude step:

$$\delta = 2\sin^{-1}\left(\sqrt{\frac{1}{\frac{1}{\tan^2\left(\frac{d}{2R}\right)}+1}}\right) \quad (1)$$

where:
δ is the is the step size for either the latitude or the longitude;
d is the discretization corresponding to either the latitude or the longitude that is set by the user; and
R is the radius of the Earth in meters.

Once δ is calculated, it is converted from radians to degrees to get the proper step needed for the latitude/longitude. Eq. 1 is derived from the haversine formulation to calculate the great-circle between two points on a surface, in this case, the Earth. Note that this formulation assumes a spherical object as well as a smooth surface. As such, the distance calculated by this formulation will have some error associated with it. The formulation is reproduced below:

$$a = \sin^2\left(\frac{\Delta\phi}{2}\right) + \cos(\phi_1)\cos(\phi_2)\sin^2\left(\frac{\Delta\lambda}{2}\right) \quad (2)$$

$$c = 2a\tan2(\sqrt{a}, \sqrt{1-a}) \quad (3)$$

$$d = Rc \quad (4)$$

where:
φ is the latitude;
λ is the longitude;
R is the radius of the Earth;
d is the calculated distance; and
a and c are intermediary values which correspond to different geometric lengths within the sphere.

To derive Eq. 1 from Eq. 2-4, the first point is set to 0° latitude and 0° longitude. The second point is then set such that the traversal only happens in the direction of interest, such as δ° latitude and 0° longitude if the step for the latitude was being calculated, and d becomes the user input step size. The step size for the latitude will determine how many rows the matrices will have as well as the latitude value that will be used in that row while the longitude step size will determine how many columns the matrices will have as well as the longitude value that will be used in that column. In addition, the latitude and longitude each have their own δ, effectively allowing the user to control the size of the matrices used for the simulation. This means that the user can set a large discretization for a high level, quick simulation of the area or use a smaller discretization for a more detailed analysis.

Once the latitude and longitude matrices are constructed, a matrix of all zeros the same size as these matrices will be made which will form the basis of the RGB matrix, which is also part of map matrix 50. The purpose of the RGB matrix is to encode all of the road information from the shapefile as well as the traffic information, if it is available, within a one or more matrices on which the ABM can run the vehicle simulations. For simplicity, an element of the matrix that has a value of zero is defined as an empty space on the map, which the agent will not be able to travel on, while values of one, two or three designate that the element is a road with traffic levels of green, orange or red respectively, which will each have different effects on the speed of the electric vehicle later in the simulation. If there is no traffic information input into the script, it will set any road to have a value of one within the corresponding element of the matrix.

To populate the roads within the RGB matrix, the script takes each individual polyline and numerically determines which elements of the matrix fall within that polyline. This is done by taking the first two points from the set of points defining the polyline and fitting a linear equation to them in the form of y=ax+b where y is the latitude and x is the longitude. A check is then performed to determine if the slope is either greater than 5000 or infinite. If this check is true, a new linear equation is determined in the form of x=a'y+b'. This is done to ensure numerical stability and account for any cases where the line segment might be vertical, in the case of the infinite slope, as a large or infinite slope in the first equation means that the second equation will have a slope that approaches zero. Because the polylines of the shapefiles are a series of linear segments defined by the set points, using the linear fit will ensure that all of the characteristics of the polyline are captured within the RGB matrix.

The script performing map generation 102 starts at the first point used to make the linear fit, which is the first point of the polyline, determines which element in the RGB matrix is the closest to that point and fills in the corresponding value to that element, depending on the traffic information. Because the latitude and longitude matrices are setup in a mesh grid format, the closest point in the RGB matrix can be found by finding the argmin of the element-wise square difference between one column from the latitude matrix and the latitude value from the evaluated point, which gives the row index of the closest point, and the argmin of the element-wise square difference between one row from the longitude matrix and the longitude value from the evaluated point, which gives the column index of the closest point. This can be formalized in the following expression:

$$RGB=[\mathrm{argmin}((Y-y)^2), \mathrm{argmin}((X-x)^2)]=t; t\in(1,2,3) \quad (5)$$

where:
x and y are the calculated longitude and latitude;
Y is the first column from the latitude matrix; and
X is the first row from the longitude matrix.

As stated earlier, the value for t is determined based on the traffic conditions, if provided, that are closest to that point. The script then enters an adaptive step size routine to determine which elements of the matrix constitute the fitted line. This is done by providing to the routine the two points which were used to make the line, the fitted equation and the maximum step sizes for both the dependent and independent variables. These maximum step sizes are defined to be half of the longitude step used to build the longitude matrix and half of the latitude step used to build the latitude matrix and which one is used for the dependent and independent variables will be dependent on the formation of the linear fit. The routine starts by calculating the midpoint between the two points and, using the fitted equation, determining the corresponding dependent variable. It then checks to see if the step in the dependent or independent variable exceeds the set threshold. If the midpoint fails these checks, then the routine recursively calls itself to split the line segment in half again and examines the new line segments to see if they pass the checks. Once the checks are passed, the routine uses Eq. (5) for the points that define the current line segment that is being checked. This routine allows the algorithm to dynamically and efficiently determine the points that need to be added to the RGB matrix to fully capture the current part of the polyline. Once the routine has reached the end, Eq. (5) is used on the second point that was used to make the linear fit. The routine then moves on to the next part of the polyline by remaking the linear fit and using the adaptive step size routine using the second and third points from the polyline set of points. This process continues through the entire set of the polyline points, mapping the geometric shape defined by this polyline into the RGB matrix. Because the processing of one polyline from the shapefile is completely independent from the other polylines, the algorithm for mapping the shapefile into the RGB matrix can be parallelized over the polylines. This allows for the script to be able to efficiently process large shapefiles that consist of thousands of polylines within a much shorter time than without the high-performance computing.

While the process mentioned above covers conversion of a shapefile into a matrix for encoding the road information, in alternate embodiments, the method also has the ability to use OpenStreetMaps along with the corresponding OSM and planetOSM files to create these representations of the roads. OpenStreetMap provides a variety of advantages, including, for example, additional framework that can be used to augment road network information that has been provided through the shapefiles. As such, in some embodiments, the OpenStreetMaps may be used in addition to the shapefiles. As would be realized by one of skill in the art, other sources for map and road data may be used, for example, Google® Maps.

With the shapefile processed into the RGB matrix, the next part of the map generation script can begin to import the relevant environmental data 20 which will be used to enhance the dynamics of the agents. Being able to account for these environmental factors when simulating the electric vehicles allows the method to effectively and realistically estimate the range of the vehicle by taking into account the extra power load that could be drawn from the battery due to, for example, wind or elevation changes, as well as simulate the impact that temperature has on the dynamics of the battery.

For simulating the electric vehicle, various environmental factors may be considered, for example, wind speed, wind direction, elevation and temperature. In some embodiments, the wind and temperature information may be obtained using the NREL Wind Toolkit is used for analysis performed for area within the United States. The NREL Wind Toolkit is a 50 TB database of one-hour resolution data which covers the United States, the Baja Peninsula and parts of the Pacific and Atlantic Oceans over the span of seven years. In addition, the toolkit provides the data at several different altitudes which is useful for applying the analysis to several different types of vehicles, including, for example, electric aircraft.

In some embodiments, the national elevation map published by the United States Geological Service (USGS) may be used as a source of elevation data for the same area covered by the NREL Wind Toolkit. The national elevation map comprises the results from many different elevation data sources and has various scales of resolution. To query this database, a series of points representing the latitude and the longitude must be given to the system, which will then return the same points with the corresponding elevation in meters and feet. Thus, the data was first queried from the NREL Wind Toolkit for a particular day and then the points within this data were broken up into smaller groups of points and automatically fed into the query system to build an elevation reference set that uses the same points as the data provided by the NREL Wind Toolkit. Unlike the NREL Wind Toolkit, which needs to be queried for each different condition under examination, the process for obtaining the elevation data only needs to be run once. Any subsequent runs to obtain further elevation data need only be done to update the values that have been queried as the national elevation map is frequently updated.

Once the reference data has been gathered for the environmental factors of interest, they are interpolated into the map matrices 50. First, the imported data is reconfigured into a set of three matrices wherein the first matrix contains the latitude of each point, the second matrix contains the longitude of each point and the third matrix contains the corresponding data. A matrix of the same size as the RGB matrix is constructed for each of the environmental factors and filled entirely with zeros. The script then visits each element in the RGB matrix and determines if it is an empty space or if it contains a road.

If it is an empty space, the script moves on to the next element and does not perform the data interpolation as the empty spaces will not be relevant in the calculations that will be subsequently performed. If the space contains a road, it first uses an expression similar to the left-hand side of Eq. (5) to determine a point in the reference environmental data that is close to the current element in the RGB matrix. However, because the reference environmental data is not a structured grid, the point in the reference data found using this method will not be the closest point to the element in question of the RGB matrix. To find the closest point, Eqs. (2)-(4) need to be used. This process is computationally expensive, however, so the point found using the other method will be used as the center of a search window. This search window will encompass approximately 50% of the original reference data and is also used in the great-circle distance equations. This is done so that the computationally expensive part of the routine has to go through as little data as possible and, thus, the overall process is speeded up. The routine then uses the distances to determine the point in the reference data that is closest to the element in the RGB matrix. A 3×3 calculation window, centered on that point, is then extracted and used in an inverse distance weighted, 2D interpolation to determine the value of that environmental factor at that element in the RGB matrix. Similar to the polyline discussion above, the calculation of the environmental factors for each element in the RGB matrix is independent and can therefore be parallelized to decrease the overall time needed to perform this step.

The map for the ABM simulation is completely generated once the 2D interpolation has finished. The result from map generation script is a series of matrices 50 which will all have the same number of rows and columns and will each contain a different set of data of the map. These matrices 50 include the mesh grid style latitude and longitude, the RGB matrix defining where the roads are and, if it was available, the traffic conditions, and the matrices for each of the environmental factors including, but not limited to, the temperature, wind speed, wind direction and elevation. As such, using the same index call on each of the matrices will provide the ABM simulation the latitude and longitude of that element, whether it is a road or not and, and if it is a road, the traffic and environmental conditions at that element.

High-Fidelity Agent Dynamics

The next step in the process is to perform a plurality of individual vehicle simulations 104. To accurately assess the performance of a fleet of electric vehicles, and to more accurately determine the most efficient and optimal placement of chargers, it may be preferred to run simulations of vehicles of various types numbering in the hundreds or thousands of iterations. Prior to running the simulations, an additional matrix containing existing charger locations and possible future charger locations is created and initialized. In addition, several statistics matrices are initialized and used to contain data regarding the individual simulated trips taken by the simulated electric vehicles and overall fleet statistics. Lastly, individual agents are set up to run a plurality of simulated trips in parallel, depending on the hardware capabilities of the platform on which the simulations are being run. For example, in a parallel computing environment having 64 cores, one core may be set aside to manage the execution of concurrent simulations in the remaining 63 cores. The process may be repeated until the desired number of simulations is completed. The total number of simulated trips may, in some embodiments, be a user-specified parameter.

Figure 2:
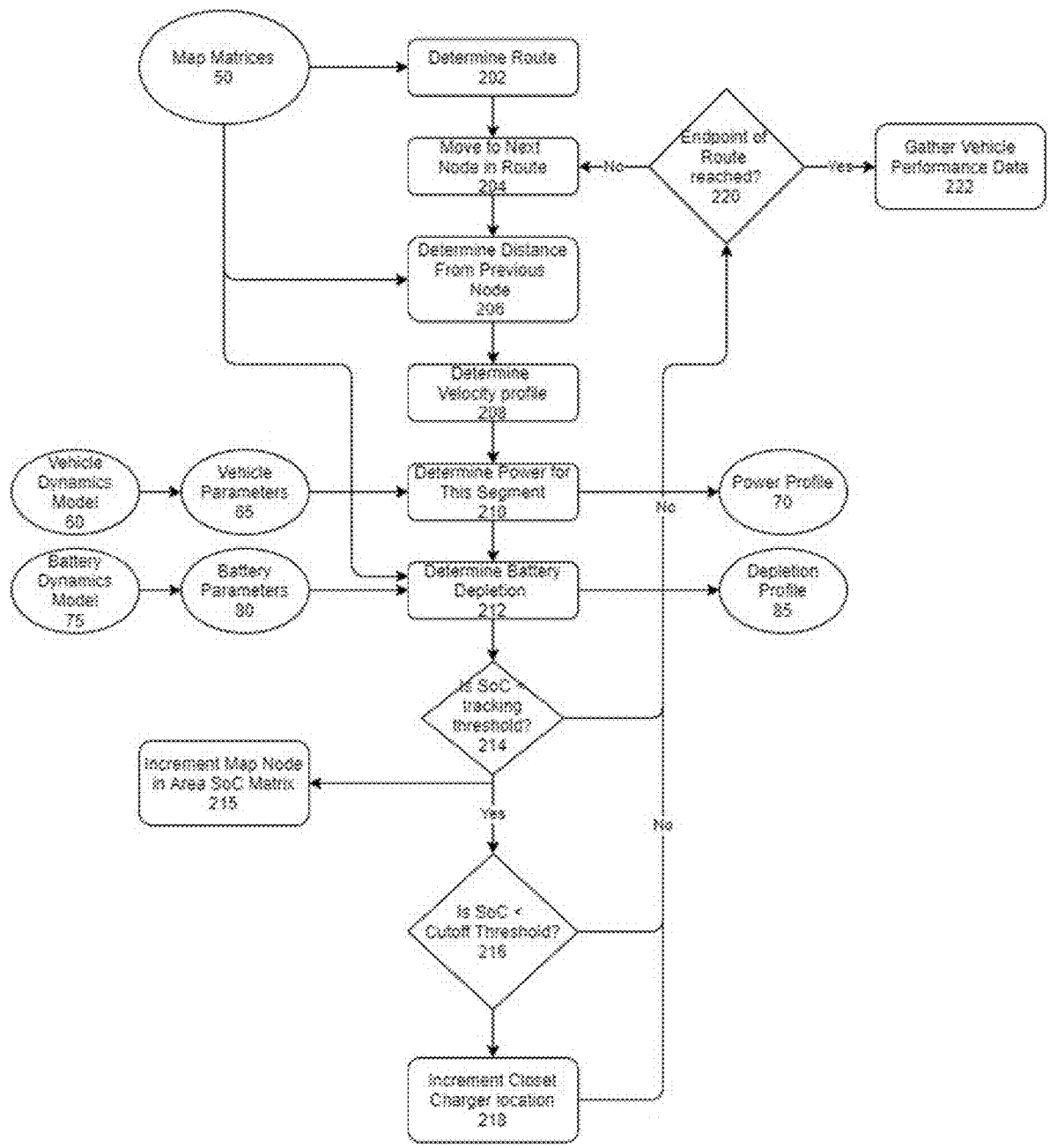
FIG. 2 is a flowchart showing the simulation of individual vehicles executing trips within the target area.

A flowchart showing the steps in the simulation of a single simulated trip are shown in FIG. 2. At the core of the ABM simulation is the dynamics that dictate the actions of the agent simulating a vehicle traversing the map and the corresponding costs that tie the simulation to the real power usage of the EV. At the beginning of each agent simulation, the route that the simulated EV will take is determined at 202. The first things that are chosen are the origin of the simulated vehicle and the destination(s) of the simulated vehicle, where the number of destinations, in some embodiments, may be a user-settable parameter. In various embodiments, the origin for the simulated vehicle can either be randomly chosen from all of the elements from the map matrices 50 that are roads, chosen an a particular type such as a residential area, commercial area, etc. or chosen from a supplied list of origins from the user. These options can also be mixed such that some agents are randomly spawned while others are chosen based a supplied list or biased to a particular type of area based on a distribution. For spawning in a particular area, the agent randomly selects a location of the selected origin type from a supplied list and then uses the great-circle distance equations to determine which element from the map matrices is closest to that location and uses that element as the origin.

In choosing the destinations, the first destination is set by the user to be either random, biased by type or chosen from a supplied list in the same way that the origin is selected. All subsequent destinations are then chosen based on a probabilistic transition matrix, set by the user, which will determine if the agent travels back to its origin or goes to a separate destination, which can again be chosen using the three different paradigms previously described. These methods are chosen to allow for a wide variety of routes to be simulated in the target area, while also providing a way to realistically bias the routes to emulate what might happen during a typical day in that area.

Once the origin and destination(s) are chosen, the method begins by determining, at 202, the route that the simulated vehicle will take through the map matrix 50. In a preferred embodiment, the routes for this simulation are determined using a well-known algorithm for path planning known as A*, although in other embodiments, any path-planning algorithm may be used. This algorithm has been widely adopted for its simplicity in determining the path in a gridded space from an origin to a destination that minimizes the defined cost in a variety of spaces such as vehicle routing. In addition, this algorithm is highly modifiable, allowing for additional considerations to be included within the determination of the route. For this simulation, in some embodiments, the A* algorithm is set to be allowed to make diagonal movements within the matrix and the cost is defined to be the distance traveled as searches through the RGB matrix. In addition, the A* algorithm is restricted to only move on the roads, as would be expected of a car traveling normally, and can't enter any area in the RGB matrix that is defined as an empty space (i.e., no roads). This algorithm effectively allows the agent to determine the route that minimizes the distance traveled (i.e., the "shortest distance" route) which is a common method of navigation used by many drivers using navigational GPS units. This algorithm is first used to find the route between the origin and the first destination of the agent and then, if necessary, between each of the subsequent destinations, in the order they were determined in the previous section of the algorithm. The routes for each pair are then returned as a series which start at the starting point of the route and then list each subsequent element in the map matrix that must be visited, to get to the final destination point in the list.

Because the routes are determined between points in the order that they were decided, the ending point for the first route, which is the first chosen destination, will be the starting point for the second route. Thus, one of the points can be removed and the lists merged such that one large route, comprising of the path taken to get from the origin to the first and second destinations can be made. This is done for each of the determined routes such that the end result of this section is just one large series of points which details the entire path of the agent through the map.

With the route of the agent determined, the agent can begin to move the simulated vehicle through the map and the method tracks the power usage of the agent as well as the resulting depletion of the battery. The method starts by setting the initial information of the simulated EV, including, for example, determining the characteristics that describe the EV, such as the coefficient of drag and the frontal area for an electric car/truck, as well as the initial charge of the battery. The initial charge of the battery for the vehicle can be set to either full or less than full. The initial charge the battery may be sampled from a distribution set by the user such that the battery might only be, for example, 90% charged or less. This is done to allow the simulation to deal with vehicles that don't go start the route with full charge which can happen if, for example, the owner of the vehicle forgot to charge their vehicle overnight. The aforementioned characteristics of the vehicle are determined using details provided by the user, which will either set all of the agents to have the same vehicle characteristics, choose the characteristics from a library of choices or choose the characteristics based on provided distributions.

Once everything is initialized, the ABM moves the simulated vehicle to the next point within the route at 204 and calculates the power needed to move from the previous point to the current one as well as battery depletion that happened during that movement. This step begins by calculating, at 206, the distance traveled by the agent in moving between those points using the great-circle distance equations. The algorithm then determines the power that was utilized by the agent when traveling this distance. This is done using modified versions of the vehicle dynamics equations that have been implemented in the studies for platooned electric trucks and eVToLs.

Focusing on an exemplary application of the ground electric vehicles, the key challenge is to determine, at 208, the velocity profile of the vehicle as it travels that distance. This is crucial to accurately predicting the power usage in that section of the trip (referred to herein as a "microtrip"). To build the velocity profile for the EV, a reference profile is needed that is derived from road types that are similar to the ones the agents are traveling on. Velocity profiles are a velocity over time description of the travel of a vehicle when driving on different roads or through different traffic conditions. These profiles are used in many different ways outside of the scope of this invention to measure the fuel economy of a vehicle and are used. For example, the profiles may be used to determine if a vehicle meets regulatory standards. Because the velocity profiles describe forward travel along different roads, an assumption is made within the algorithm that the velocity profile is greater than or equal to zero for all time in the profile. This is necessary because the velocity profile needs to be transformed into a distance profile to link it to the travel that is done on the map. Thus, by having a velocity profile that is strictly greater than or equal to zero, the integrated distance profile, which is assumed to start at zero distance traveled for any route, will be monotonically increasing for all time of the profile. To ensure stability for calculations done on the distance profile, flat sections are shrunk to a single point on the distance profile. Once the final distance profile is determined, the velocity profile can be easily linked to the travel done in the route by the agent.

As stated, it is assumed that each route starts at zero distance traveled on the distance profile which is the first point of the distance profile. The elevation and the road grade is then calculated by using the elevation data corresponding the start and end points of the microtrip. The method takes note of whether the change in elevation is positive or negative, which will impact the power drawn from the battery due to the road grade. The change in elevation is then used in conjunction with the distance calculated for the microtrip to determine an adjusted distance traveled using the Pythagorean Theorem. The intersection of the distance profile and the adjusted distance traveled by the agent in the microtrip is then calculated to determine the time required to travel that microtrip. Due to the monotonic nature of the distance profile as well as the modifications done to the profile, this intersection calculation will return only a single point. The velocity profile up to that time is then extracted and sent to the power calculation as the velocity of the EV as it went through the microtrip. The distance traveled from the microtrip, as well as the intersection time, is stored for use in the next section of the route.

With the velocity profile for this section of the route determined, the rest of the variables for the power calculation need to be determined. First, the acceleration for all times in the series are determined using the following equation:

$$a_i = \frac{V_i - V_{i-1}}{t_i - t_{i-1}} \qquad (6)$$

where:
i is the current element in the series;
V is the velocity from the extracted velocity profile;
t is the corresponding time from the velocity profile; and
a is the acceleration.

For time t=0, the acceleration is set to be the same as the acceleration in time t=1. For all other microtrips, the first element in the series uses the last values from the extracted velocity profile of the previous route segment. The other part that needs to be calculated is the relative wind velocity to the EV. The wind heading, wind speed and altitude of the wind are extracted from the start point of the microtrip. The wind speed is then brought down to one meter using the Hellmann altitude formula. The Hellmann altitude formula is a simple approximation that translates the wind speed from one altitude to another based on the difference in altitude and an exponent which varies based on the environment that the wind is in. This is a relatively rough approximation however it is valuable for providing useful results in most environments and is used in many different practices. Because the coefficient varies based on the environment that the wind is in, the road type is mapped to the coefficients to allow the wind to vary based on the location of the simulated vehicle on the map.

Once the wind has been translated to an altitude of one meter, a comparison of the wind heading to the heading of the vehicle is done. The wind heading is defined to be 0° when pointing north, 90° when pointing east, 180° when pointing south and 270° when pointing west and it is assumed that the wind heading that comes from the reference data is unchanged by the translation of the wind from the reference altitude to one meter in height. The heading of the vehicle can be determined using the great-circle equations. It is important to note that for this calculation, the bearing of the simulated vehicle will be determined at the initial point, and it is assumed that the simulated vehicle follows a straight line along a the great-circle arc to the next point. While this assumption will not hold in general, so long as the discretization of the map is set to be small, the change in heading will not be too great as the vehicle travels the microtrip. The equation for determining the heading of the vehicle is as follows:

$$0 = a\tan 2(\sin(\Delta\lambda)\cos(\phi_2), \cos(\phi_1)\sin(\phi_2) - \sin(\phi_1)\cos(\phi_2)\cos(\Delta\pi)) \qquad (7)$$

where:
λ is the longitude;
φ is the latitude;
θ is the bearing; and
$\phi_1, \lambda_1$ are the latitude and longitude of the origin respectively; and
$\phi_2, \lambda_2$ the latitude and longitude of the destination respectively.

The a tan 2 function is significant as it will return the bearing in the appropriate quadrant however the returned value will need to first be transformed to degrees and then translated so that the values fall in the range of 0° to 360°. Using Eq. (7), it can be seen that a vehicle traveling north has a bearing of 0° degrees, a vehicle traveling east has a bearing of 90°, a vehicle traveling south has a bearing of 180° and a vehicle traveling west has a bearing of 270°, which matches the headings of the wind. This means that the vehicle heading can be subtracted from the wind heading to provide the relative angle the wind has compared to the vehicle. This allows for the wind to be decomposed into the component that is blowing along the direction of the vehicle as well as the component that is blowing perpendicular to the vehicle (i.e., the crosswind) in addition to the whether the wind is helping the vehicle move forward or working against it. After the components of the wind are determined, the relative wind speed along the direction of the simulated vehicle is calculated by adding or subtracting the speed of the vehicle to the wind speed based on whether the wind is blowing with the vehicle or against it.

With all of the parameters for the power equations determined, the power used by the vehicle to traverse the current segment of the route may be determined, at 210, using a vehicle dynamics model 60. Parameters specific to the vehicle 65, for example, drag coefficient, frontal area, etc., may be incorporated into the equations comprising the vehicle dynamics model 60. The power due to wind is calculated along the independent components first and then combined into a single value using standard component analysis. The power due to the elevation will be either added to or subtracted from the total based on the whether the difference in the height was positive or negative. The power due to rolling resistance and inertia can then be calculated without any need for adjustment using the vehicle velocity and acceleration vectors. All of the power components for each segment of the route are later combined to provide a power profile that describes the power drawn from the battery for each time instance in the extracted velocity profile.

Efficiencies can then be applied on a per instance basis where the efficiencies reduce the power that flows back into the battery, if the total power is negative, or increases the power drawn from the battery, if the total power is positive. Multiple efficiencies can be taken into account in this step including regenerative braking efficiencies, motor efficiencies, etc. The end result of this step is the for the segment of the route being added to the power profile 70 of the vehicle, which is directly drawn from the battery pack.

With the current segment of the power profile fully computed, the corresponding depletion of hundred will the battery for the current segment of the route is computed at 212, using battery dynamics model 75 and any relevant battery parameters 80, and incorporating the environmental factors, such as the temperature, stored in map matrices 50. The total power demand on the battery is supplied by all the cells in the battery pack. The power per cell is the total power of the battery pack normalized by the number of cells in the pack. Each cell experiences an equal power load. In theory, if the variation between cells is ignored, simulating a single cell is sufficient, and the simulation results from the single cell can then be scaled for the full battery pack. The state of charge (SoC) depletion of a cell is significantly affected by the temperature of the cell, which, in turn, is affected by the external or ambient temperature. Hence, simulating the cell in different temperatures can provide drastically different SoC depletion profiles. The effect of temperature on the SoC can be simulated using battery dynamic models 75 of different fidelities, for example, both Pseudo C2D battery models and Single Particle battery models can simulate the effect of temperature, however, the fidelity and accuracy of the models are vastly different. On the other hand, higher fidelity generally leads to higher computation time and, hence, a careful study of the trade-offs is required to choose the model that is appropriate for a given platform.

Once the battery depletion for the segment has been computed by the battery dynamics model 75, the method checks, at 214, to see if the total battery depletion has reached a tracking threshold set by the user. If not, the process moves to the next node in the route at 204. If the current SoC is below the tracking threshold, a count for the current map node is incremented at 215, indicating that additional chargers may be needed near that node. The process then checks, at 216, to see if a user-settable cutoff threshold SoC has been reached, indicating that the vehicle should proceed to the nearest charger. This is used to ensure that if, for example, the vehicle had to go to a charger after this point, that it has enough charge within the battery to make it to the assigned charger without needing to actually simulate the route from where the vehicle currently is to the assigned charger. If the vehicle has not passed the cutoff SoC, the process checks, at 220 to see if the end point of the route has been reached. If not, the vehicle moves to the next node in the route at 204. If the SoC cutoff threshold has been reached at 216, a counter for the closest charger location is incremented at 218, indicating that the vehicle has visited that charger. In one embodiment, the current SoC may be adjusted to take into account the level (typically 100%) to which the battery would have been charged at the closest charger location and the simulation allowed to continue. In other embodiments, if the simulated vehicle has passed the cutoff threshold at 216, then the algorithm records the parameter profiles and terminates without completing the route.

The parameter profiles, such as the battery pack power, cell power, SoC, vehicle velocity, etc. are stored in a total output vector at 222, so that the profile over the entire trip can be plotted. Once the route has been terminated, processing moves to the next stage of the calculation, such as charger placement, if all simulations have been completed.

When the method moves on to the next segment of the route at 204, it takes the next point in the route list as the destination point and uses the previous destination point as the origin for the microtrip calculations. When calculating the intersection of the distance profile, the segments will eventually add up such that the total distance traveled will go beyond the maximum value of the distance profile. Once this occurs, the algorithm will loop back to the beginning of the distance profile and create a stitch, if needed, between the final velocity value and the first velocity value of the velocity profile using the acceleration at the end. Thus, the EV is assumed to follow the same velocity profile(s) throughout the duration of the trip and will continuously loop through it as needed.

Fleet Scale Simulation

When a fleet scale analysis is desired, multiple agents using the previously described dynamics can be employed to estimate the statistics of the fleet at 106. An important result of the formation of the agents in the previous section is that each agent is completely independent. This is because the agents don't route based on the traffic conditions or popular routes chosen by other agents. While this is not completely representative of how EVs would navigate using the smart GPS tools that are available, it still allows for meaningful results as even smart GPS tools cannot avoid certain areas. The independence of the agents means that the fleet scale simulation can be completely parallelizable across the agents, vastly reducing the computation time needed to produce the fleet scale results. This also means that many more agents can be simulated using high-performance computing, allowing for the fleet scale statistics to use more data points in the respective calculations, thereby improving the statistical significance of the results while also providing for more map coverage with the agents.

Figure 3:
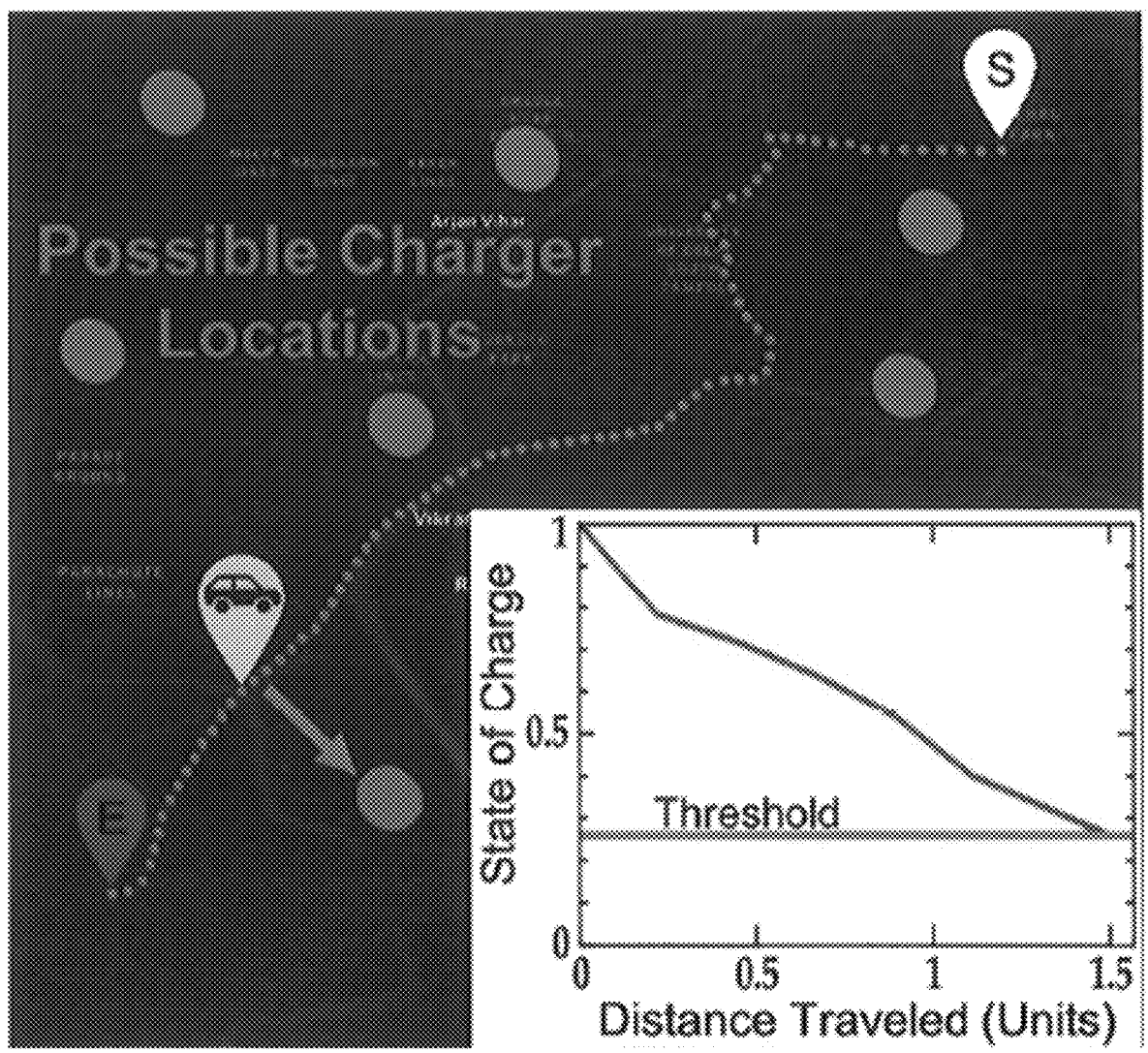
FIG. 3 is an example diagram showing hotspots indicating possible charger locations.

A variety of fleet scale statistics can be simulated within the target area using this approach. Hotspots for low SoC can be determined by tracking each agent on the map once it is below, for example, 50% SoC for the rest of its route. This is the threshold specified as the tracking threshold at 214 in FIG. 2. An example of hotspots is shown in FIG. 3. The information from each agent can be combined to show if there is any area on the map where SoC has a tendency to be low. This information can then be used as a justification for where chargers should be placed such that they are accessible to the vehicles that need them. In addition, a set of charger locations could be provided to the fleet scale simulation to determine which of the provided locations see the highest utilization from the fleet and are thus the locations that should be focused on for possible charger installation.

If additional information is provided, such as charger cost, servicing time, etc., an optimization loop can be run on top of this analysis to determine the optimal placement for chargers such that the demand of the electric fleet can been met, while minimizing the economic impact by installing only the chargers needed by the fleet in the locations that will best service the fleet. At 108, the information regarding the optimal charger deployment is output.

Results and Discussion

The invention as a platform augments traditional vehicle dynamics models using geospatial wind and terrain data to monitor change in wind and elevation over a route as well as high resolution temperature data which will impact the battery dynamics. Each of these aspects affects the power requirements of terrestrial vehicles to a varying extent. The wind data is used to create wind vector components both in the direction of travel for the vehicle and perpendicular to the vehicle to determine the additional power needed to overcome the wind and/or how much the wind is aiding the vehicle in its travel. The elevation data is used to determine the road grade throughout the route and whether the vehicle is traveling uphill or downhill, which will change the power associated with the vehicle traveling on a slope. The temperature impacts the overall performance of the battery within the vehicle and will impact the degradation of the battery.

Using the platform of the invention, a variety of simulations can be performed to obtain high-fidelity data and statistics on both individual vehicles and fleets of electric vehicles.

Individual Electric Vehicle Case Study—To demonstrate the capabilities of the invention for the simulation of individual vehicles, a case study was constructed where the impact of the environment was evaluated over a trip from one end of the Commonwealth of Massachusetts to the other. A Tesla Model 3 as well as an electric pickup truck were used to both benchmark the performance of the method of the invention relative to previously validated work as well as to demonstrate the impact of the aforementioned environmental factors on the vehicle dynamics of these two different vehicles.

For this analysis, the roadway network for Massachusetts will be its highway system, obtained from a shapefile made in 2015 provided by the USGS. The wind and temperature data were obtained from the NREL Windtool Kit and were recorded on 12/21/15 at 12:00 pm, while the elevation data comes from the USGS national elevation map. The wind speed was taken at 10 meters altitude while the air temperature was taken from 2 meters altitude, both of which are the closest to the surface heights for those particular attributes offered through the NREL data set. The drive cycle used throughout this analysis, as well as the fleet analysis is the EPA Highway drive profile (HWFET). Because this drive cycle is repeated multiple times throughout the routes, the tails of this drive cycle were trimmed such that the input drive cycle starts and ends at around 30 mph.

For this case study, a single route was used within the aforementioned setup with the environmental impacts added one by one to discern how they affect the overall power requirements of the vehicles.

Figure 4:
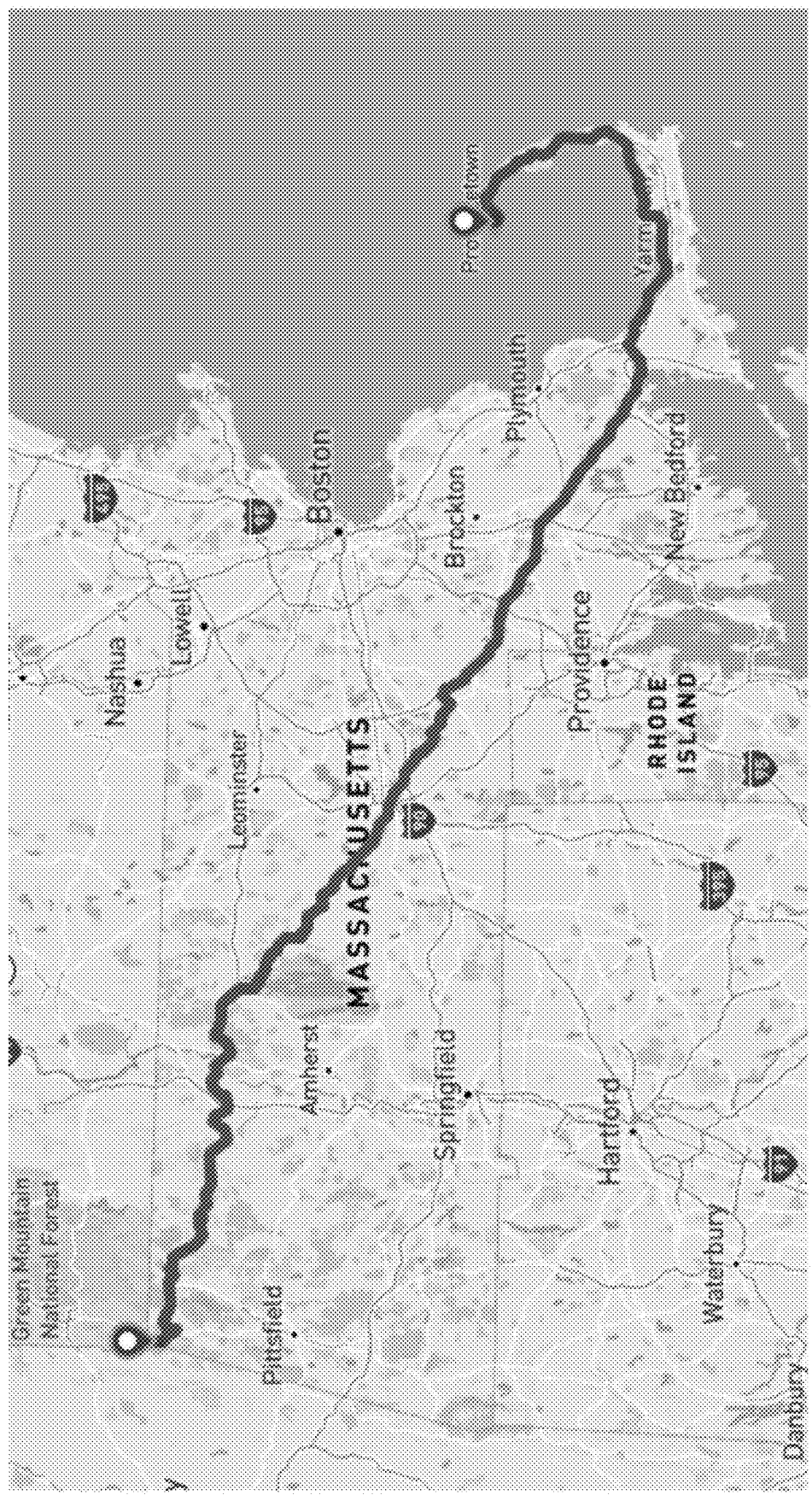
FIG. 4 shows a map of the state of Massachusetts showing a simulated trip used to evaluate individual simulated vehicles.

The route chosen for this simulation has one endpoint at 42.7214° latitude and −73.265° longitude, while the other endpoint is at 42.0443° latitude and −70.2153° longitude. The route between these two points, as calculated by the A* algorithm, is shown in FIG. 4 where (42.7214,−73.265) is the coordinate pair of the northwest point and (42.0443,−70.2153) is the coordinate pair of the southeast point. This route is approximately 263 miles long and, using the modified HWFET drive profile, will take about 5.3 hours to drive. Both of these values are similar to those that are produced through the Google® Maps routing function, thus the route and drive cycle used for this analysis can be deemed as a realistic option for vehicles traveling between these two points in Massachusetts.

For this analysis, there is no traffic considered between the two points. Thus, the aforementioned values needed no modifications throughout the simulation. Using the determined route, the method plots the profiles of the environmental factors to see how they change as the vehicle travels from one point to the next. Starting from the northwest endpoint, coordinate pair (42.7214,−73.265), and ending at the southeast endpoint, coordinate pair (42.0443,−70.2153), the profiles are determined by querying the supplied environmental databases at each point along the route.

Figure 5:
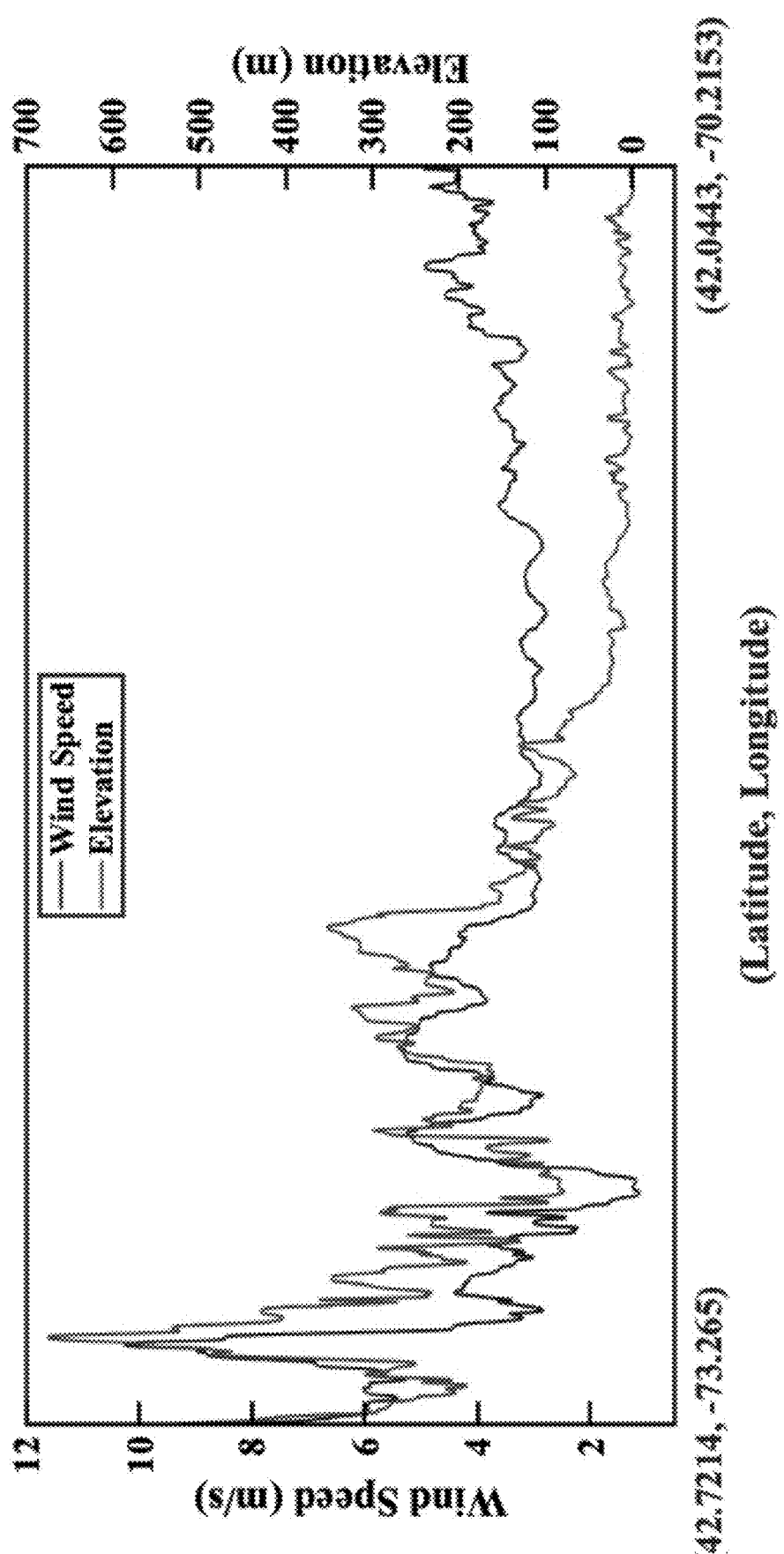
FIG. 5 is a graph showing the wind speed and elevation profiles along the route shown in FIG. 4.

The wind speed and elevation profiles are shown in FIG. 5. From these profiles, it can be seen that the wind is blowing the strongest, at about 8 m/s, in the northwestern part of the route, where the elevation is the highest, decreases to a wind speed of about 3 m/s in the middle part of the route and then slightly increases at the coast. The elevation is also the highest in the northwestern part of the route and then decreases towards sea level, zero elevation, as the route approaches the coast. These two profiles correspond very well with each other where the oscillations and characteristics in the wind profile occur at nearly the same point of the route as in the elevation profile. This makes sense as wind tends to blow more strongly at higher elevations. This tends to validate the reliability of the different data sets as these two data sets do not interact with each other within the framework of the method and thus have no knowledge about the trends exhibited by one another.

The temperature and the direction that the wind are blowing remain relatively constant throughout the entire route, with a temperature of about 280° Kelvin and a wind heading of about 120°, which means that the wind is predominately blowing from west to east.

An in-depth analysis of the impacts of the different environmental factors within this route was performed using the method for both an electric pickup truck as well as a Tesla Model 3. For the Tesla Model 3, the drag coefficient of the vehicle was set to 0.23 with a frontal area of 2.22 m$^2$ and a coefficient of rolling resistance of 0.0071. The mass of the vehicle was set to 1800 kg while the regenerative braking efficiency is set to 80% and the battery-to-wheels efficiency, which includes the efficiencies of the drive train and the battery, is set to 85.5%. For the electric pickup truck, the coefficient of drag for the pickup truck was 0.4 with a frontal area of 5.5 m$^2$ and a coefficient of rolling resistance of 0.0075. The mass of the vehicle was set to 3000 kg while the regenerative braking efficiency was 40% with a battery-to-wheel efficiency of 76%. For these simulations, the minimum SoC threshold was set to 30% and the agent, which was set to have the electric pickup truck characteristics for the results discussed below, was assumed to start with a battery SoC of 100%. The battery model used to estimate the SoC from the power profile is the CelLFit model where the power profile generated from the vehicle dynamics model is scaled to a single cell by assuming that the battery packs in both vehicles have 8,000 cells each.

Figure 6:
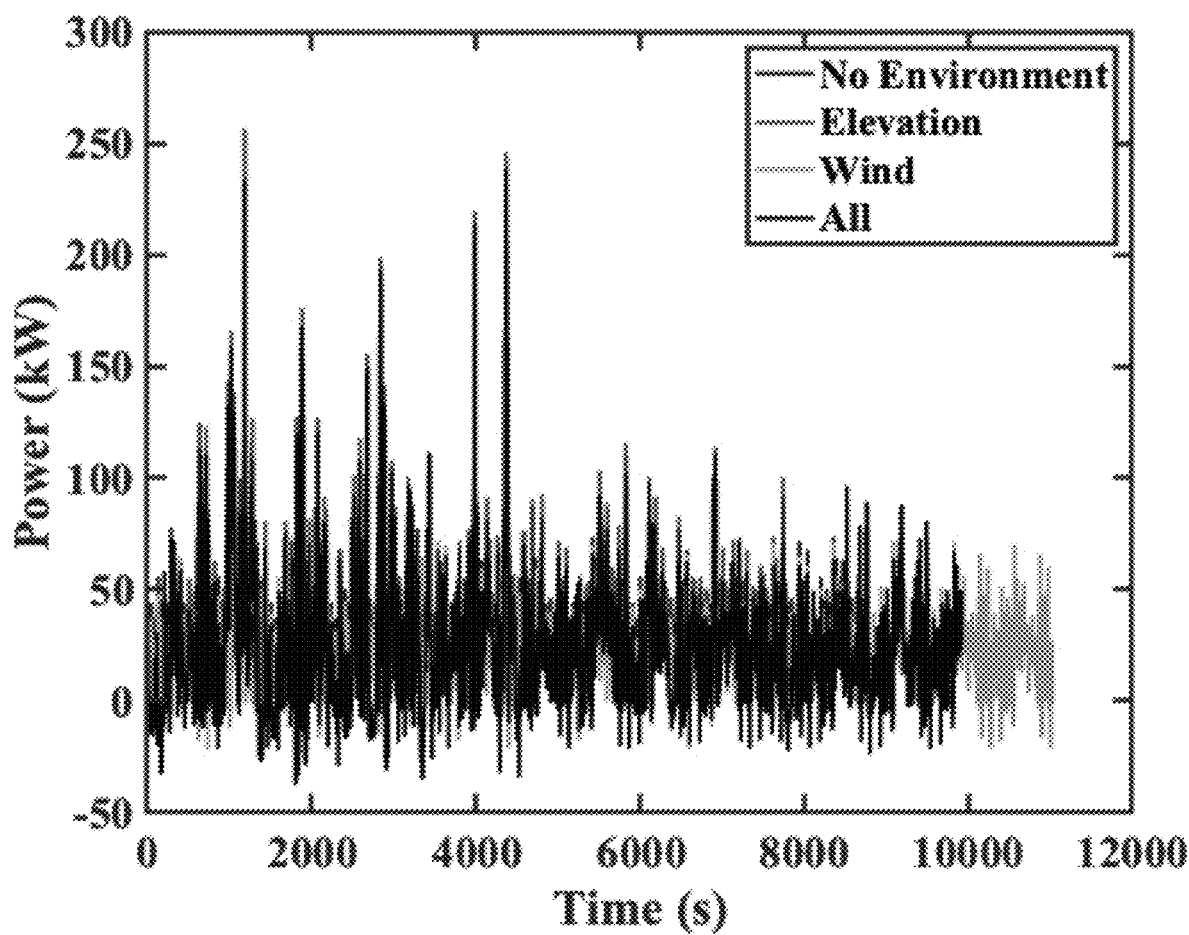
FIG. 6 is a graph showing the power profile for an electric pickup truck type agent traveling the eastbound on the route shown in FIG. 4, taking into account the effect of various environmental factors on the power profile.

The first set of simulations had the agent start at the northwest endpoint of the route and travel as far as it could towards the southeast endpoint. The first simulation has both the elevation and wind turned off, which is essentially the benchmark case that was previously discussed. The next simulation kept the wind turned off but began applying the change in elevation impacts to the power requirements of the simulated vehicle. The following simulation added in the wind effects while keeping the elevation effects turned off. The last simulation looked at the total impact of both the elevation and the wind on the performance of the vehicle. The power profiles for each of these simulations is shown in FIG. 6. Using the power profiles as well as the total distance traveled, the average energy used per mile can be computed for each of the simulations. As previously mentioned, the average energy used per mile for the no environment factors case was 570.75 Wh/mi and traveled 118.5 mi before hitting the SoC threshold. When evaluating the other simulated scenarios, the average energy used per mile in the case with only elevation considered was 630.64 Wh/mi and traveled 106.9 miles before hitting the SoC threshold, the average energy used per mile in the case with only wind considered was 447.34 Wh/mi and traveled 152.2 miles before hitting the SoC threshold and the average energy used per mile in the case with both the wind and elevation effects was 495.39 Wh/mi and traveled 136.6 miles before hitting the SoC threshold.

When comparing just the elevation impacts to the base case with no environmental impacts, the vehicle required about 60 Wh more per mile and, as a result, traveled about 12 miles less before hitting the SoC threshold. This is because the northwestern area of the route, as is shown in FIG. 5, has a lot of large elevation changes and thus the vehicle needs to expend more energy from the battery to get up those hills. While it does recover some of that when going downhill, the fact that the regenerative braking efficiency isn't 100% and the vehicle winds up going back up hill throughout this part of the route means that the overall change in the energy requirement per mile will go up. In addition, the vehicle in this case is unable to reach the section of the route where it is primarily downhill and thus doesn't get the downhill benefit which would have reduced the overall energy required per mile.

The wind only case, on the other hand, uses about 123 Wh/mi less and is therefore able to travel nearly 34 miles beyond where the base case finished before hitting the SoC threshold. This is because the wind is predominately blowing from west to east, which practically matches the heading of the vehicle as it travels along the route starting from the northwest endpoint. Thus, as the vehicle travels, the wind helps push it along and reduces the overall energy requirement of the vehicle to travel that distance.

In the simulation that incorporates all of the environmental factors, the vehicle is able to travel an additional 18 miles relative to the base case since the vehicle requires about 75 Wh of energy less per mile traveled. In this case, the vehicle is able to benefit from the wind just like in the previous case, however, now it will start to feel the penalty of having to power its way up the hills within that area. Thus, as expected, while the energy usage per mile for this vehicle is larger than the wind only case however, the penalty from the elevation is not as severe since the wind is able to help the vehicle reach the part of the elevation profile where it is essentially just moving downhill. Thus, during that portion of the trip, the vehicle receives energy benefits from both the wind and the downhill road grade. When all of the environmental factors are considered, the electric pickup truck is capable of traveling about 15% farther relative to the base case. This variability, relative to what is expected from just looking at the manufacturer characteristics of the vehicle, has a variety of implications on what the vehicle operators should expect as well as on the development of the infrastructure needed to support these vehicles.

To further show the importance of considering these environmental factors, the following simulations used the same route, environmental conditions, vehicle characteristics and approach except that now they start at the southeast endpoint of the route and travel towards the northwest endpoint of the route.

Figure 7:
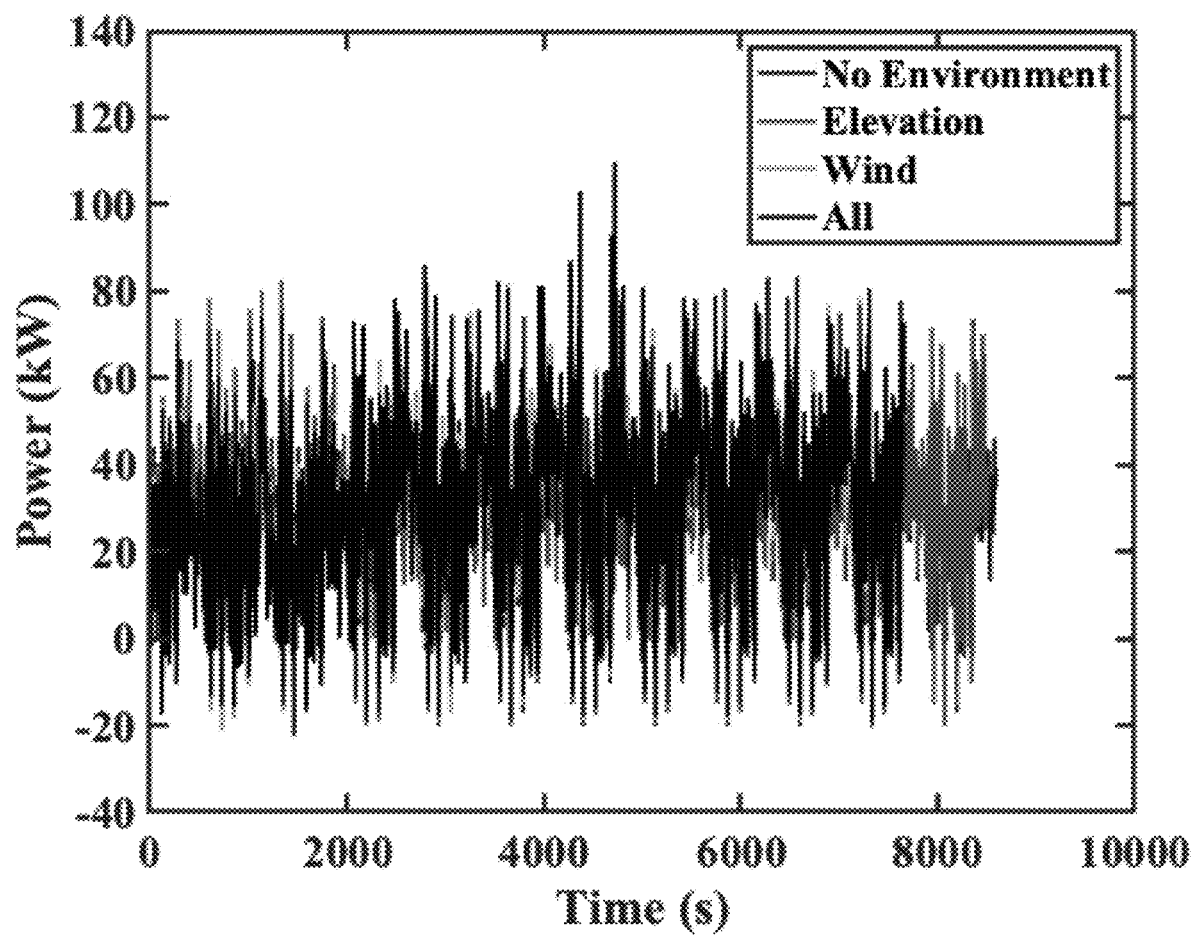
FIG. 7 is a graph showing the power profile for an electric pickup truck type agent traveling the westbound on the route shown in FIG. 4, taking into account the effect of various environmental factors on the power profile.

The power profiles for the vehicle traveling the route under these conditions in the different scenarios is shown in FIG. 7. Because the base case has no environmental factors considered, the energy usage per mile, as well as the total distance traveled, are the same as the previous simulations. The reason for this is that the route without any environmental factors is essentially the same as a long, straight runway. Without any external factors, the vehicle will travel the same distance along the runway regardless of whether it starts on one end of that runway or the other end. For the simulation that only had the elevation considered, the vehicle used 578.31 Wh/mi and was able to travel 117.3 miles before hitting the SoC threshold, while in the case that considered only the wind, the vehicle required 641.74 Wh/mi and was able to travel 105.4 miles before hitting the SoC threshold. In the case that considered both the wind and the elevation, the vehicle required 643.03 Wh/mi and was able to travel 105.3 miles before hitting the SoC threshold.

In the case where only the elevation was considered, the vehicle only required 8 Wh/mi more than the base case and thus traveled only about 1 mile less than the base case. This is because, as shown in FIG. 5, the change in elevation in the southeastern portion of the route is fairly minimal. In addition, the vehicle hits the SoC threshold just as it enters the part of the route where it begins to have significant uphill gradients. Thus, the vehicle doesn't require that much more energy per mile than the base case where no environmental factors are considered.

The wind only case, however, required about 70 Wh/mi more than the base case resulting in the vehicle traveling approximately 13 miles less than the vehicle in the base case. This is due to the fact that, unlike when the vehicle travels west to east, the vehicle in this case is traveling against the wind. Therefore, the vehicle will require more energy to travel in that direction, resulting higher energy used per mile and less distance traveled.

The case where all of the environmental factors are considered is essentially the same as the wind only case due to the fact that the energy penalty due to the wind results in the vehicle hitting the SoC threshold before reaching the part of the route with the significant uphill gradients.

These simulations highlight the importance of accounting for the environmental factors when considering the performance of the electric vehicles for infrastructure development and driving/piloting expectations.

Unlike for the eastbound simulation, where all of the environmental factors were considered and where the vehicle was able to travel about 15% further than the base case, the vehicle with all of the environmental factors considered for the westbound simulation traveled approximately 11% less than the base case. Thus, if, for example, charging stations were deployed using the black box estimates for the range of the vehicle, which would essentially be equivalent to the base case scenario in this simulation, there is a chance that the vehicles travelling westbound on this route might not make it to the charging stations before running out of charge in the battery. In addition, because these environmental factors are dynamic, the estimation for the operational range of a vehicle will vary throughout the year even in a single location. Thus, in depth studies are needed for the different locations, including their environmental patterns, to properly place the infrastructure for electric vehicles to ensure that the terrestrial vehicles can make it to a charger as easily as gasoline vehicles can reach a gas station if needed and that electric aircraft are capable of making it from one station to the next without running out of power midair.

Figure 8:
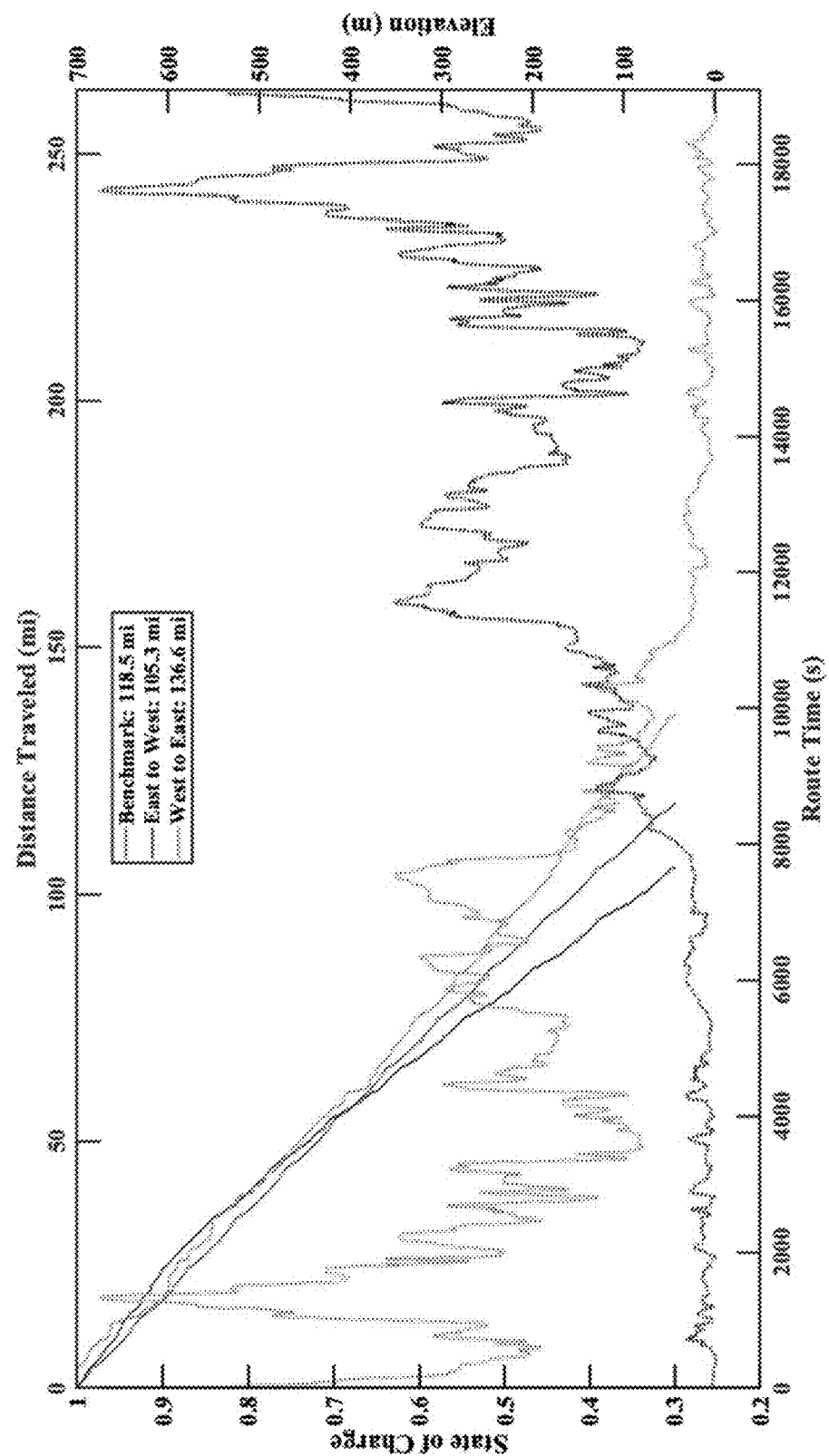
FIG. 8 is a graph showing the SoC depletion curves for an electric pickup truck type vehicle for a benchmark trip taking into account no environmental factors and for eastbound and westbound trips which do take into account environmental factors.

Observing the SoC trends for the entire route further demonstrates the impact that the different environmental factors have on the vehicles. The SoC trends for the vehicle traveling with no environmental factors (the benchmark), for the vehicle traveling from the northwest endpoint to the southeast endpoint of the route with all of the environmental impacts, referred to as eastbound, and for the vehicle traveling from the southeast endpoint to the northwest endpoint of the route with all of the environmental impacts, referred to as westbound, are shown in FIG. 8.

The first approximately 50 miles of the route shows all three of the different scenarios behaving fairly similarly, with the westbound scenario having the highest SoC. This is due to the fact that in the eastbound case, the large uphill gradients experienced by the vehicle require more energy and, while the wind is offsetting some of it, the westbound case only has to deal with the wind against the vehicle. In addition, as seen in FIG. 4, the first part of the westbound route actually has the vehicle traveling with an eastern/southeastern heading, thus it will receive benefits for traveling with the wind. However, once the eastbound case makes it past the larger elevation gradients, the power requirement needed to overcome elevation changes decreases as the wind continues to push the vehicle while the vehicle traveling westbound starts to travel against the wind. Thus, the eastbound case starts to have a larger SoC than the westbound case.

By the time all of the vehicles have reached the SoC threshold, the eastbound case was able to travel over 30 miles further than the westbound case, which is nearly an additional 30% in distance traveled relative to the westbound case, due solely to the different impacts the environmental conditions had on the two vehicles. The case of the eastbound vehicle has one other interesting feature in that the SoC stays at 100% beyond the start of the simulation. This is because the vehicle starts at a high elevation and is moving both with the wind and downhill. As a result, the vehicle has a net influx of power to the vehicle and, while the battery isn't being charged (because it's already at 100% charge), the vehicle is able to travel the first few miles of the route without depleting the battery.

Figure 9:
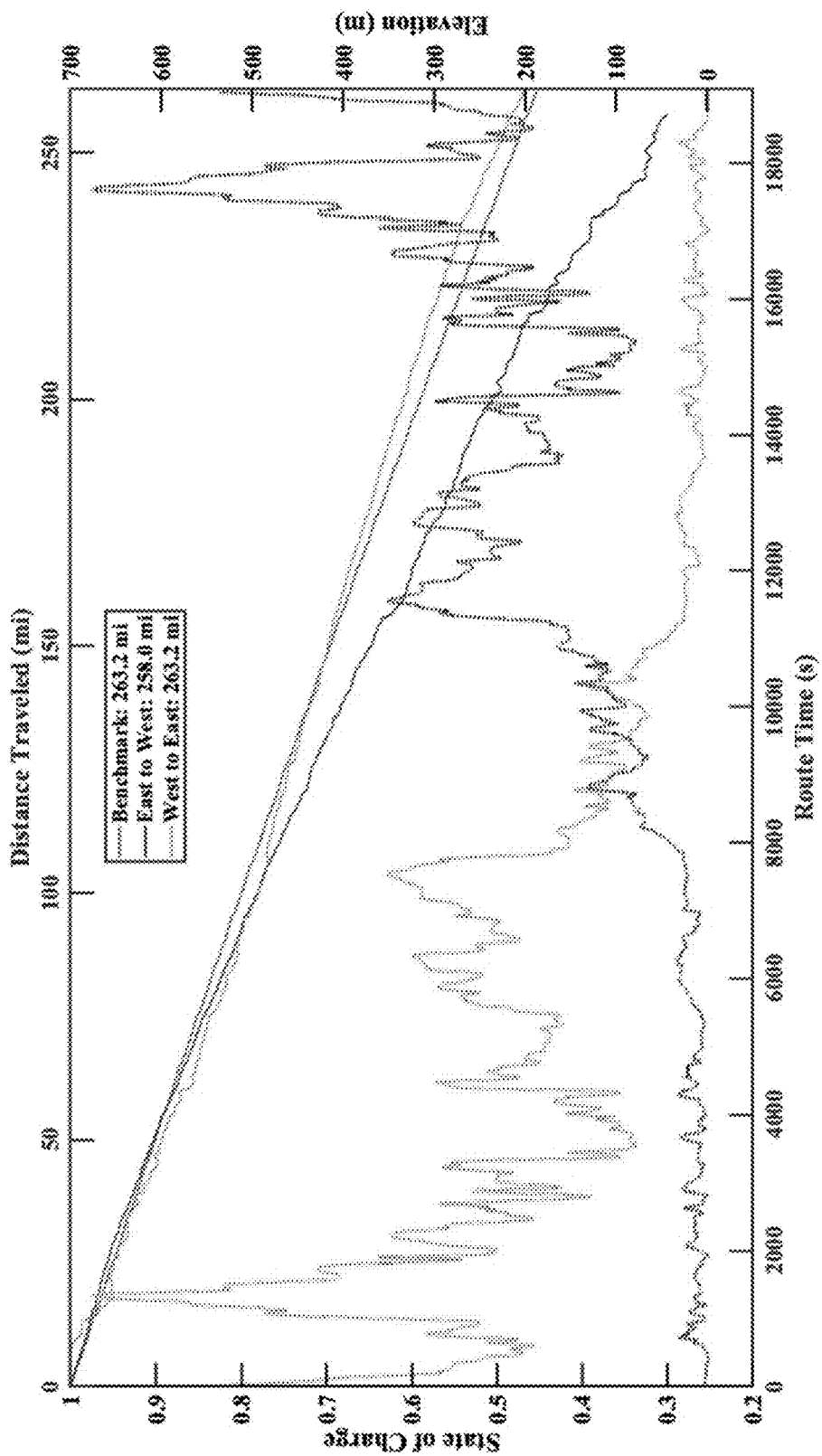
FIG. 9 is a graph showing the SoC depletion curves for a Tesla model 3 vehicle for benchmark trip taking into account no environmental factors and for eastbound and westbound trips was to take into account environmental factors.

The same analysis presented above was also done for vehicles that used the Tesla Model 3 characteristics. The SoC trends for the vehicle traveling with no environmental factors, (the benchmark), for the vehicle traveling from the northwest endpoint to the southeast endpoint of the route with all of the environmental impacts, referred to as eastbound, and for the vehicle traveling from the southeast endpoint to the northwest endpoint of the route with all of the environmental impacts, referred to as westbound, using the Tesla Model 3 vehicle characteristics are shown in FIG. 9. Unlike the vehicles, which used the electric pickup truck characteristics, the vehicles which used the Tesla Model 3 characteristics are able to travel a majority of the route and can further show how the environmental factors can compound to cause larger energy penalties/benefits for the vehicle. The trends for the SoC using the Tesla Model 3 curves have similar features to the SoC trends shown for the electric pickup truck. However, the curves for the Tesla Model 3 are much tighter together. This is because the coefficient of drag for the Tesla Model 3 is significantly less than that for the electric pickup truck. Thus, the benefit/penalty for traveling with/against the wind is not as drastic, even though it still does have a dominant effect as will be shown later. In the case of the eastbound vehicle, the wind helps the vehicle with overcoming the elevation changes, thus balancing the penalty due to uphill elevation changes, but it isn't until the second part of the route where the vehicle is essentially only traveling downhill and with the wind that the vehicle overtakes the other two cases with respect to the SoC. By the end of the route, the vehicle has an SoC of 46.8% which is only marginally better than the base case, which was able to complete the route with an SoC of 45.3%.

The westbound case, however, shows how taxing it is for the vehicle to be traveling both uphill and against the wind, even with a vehicle that is relatively aerodynamic. In the early parts of the route, where the vehicle is essentially just traveling against the wind, the curve dips below the benchmark but isn't overly taxed by the wind and would have finished the route, if it kept the same trend, with an SoC marginally less than that of the benchmark case. However, once the vehicle starts to travel uphill, the SoC gradient drastically increases and the SoC starts falling much faster than the other two cases. As a result, the vehicle in this case is unable to finish the route before hitting the SoC threshold with approximately 5 miles left to travel. While the distance traveled is only a 5 mile difference between the eastbound case and the westbound case, the fact that the eastbound case still had 46.8% SoC meant that it could, if it followed the same SoC depletion trend, have traveled approximately 80 additional miles beyond where it stopped. Thus, even for passenger vehicles, it is necessary to account for the environmental impacts as they will alter the expected ranges of electric vehicles.

Figure 10:
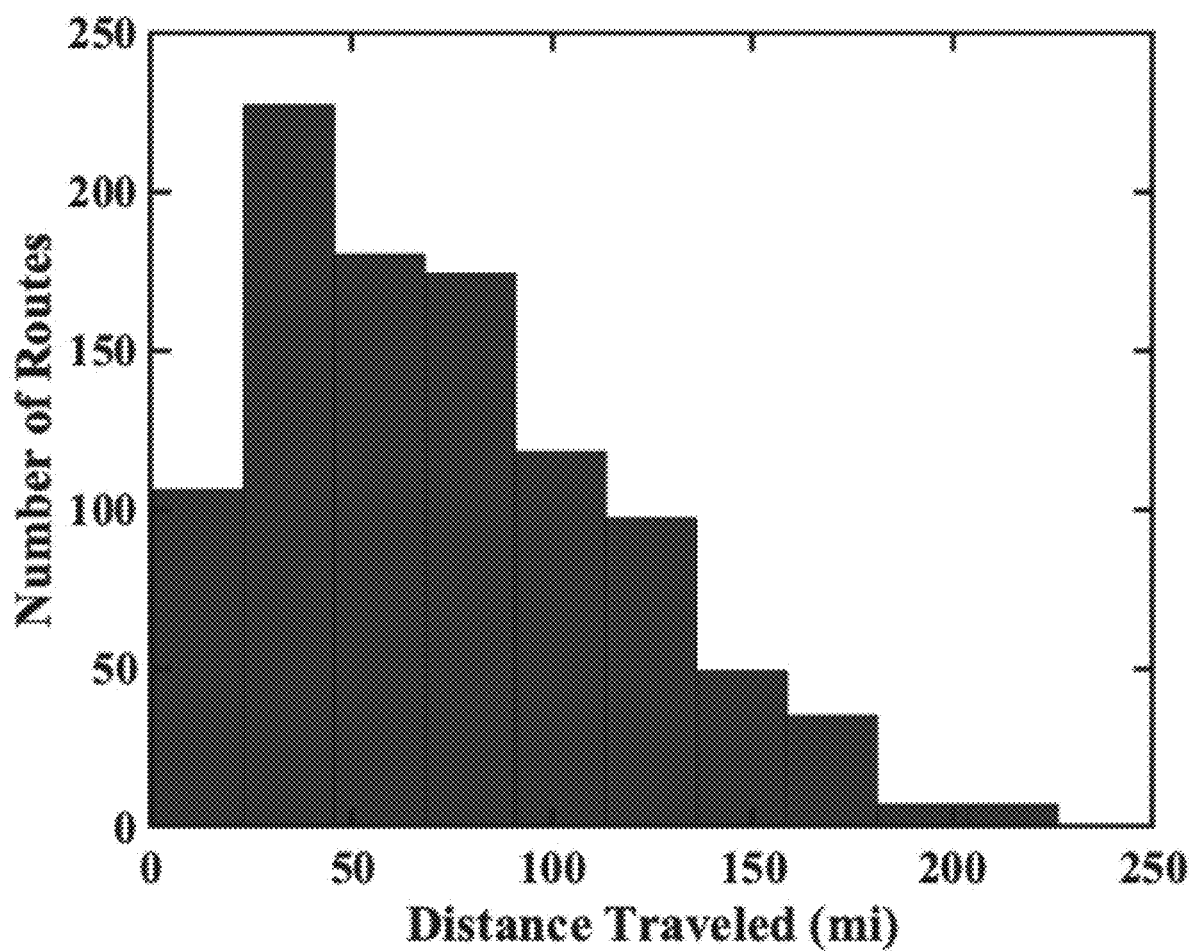
FIG. 10 is a histogram showing the distribution of distances traveled by 1000 simulated agents.
Figure 12:
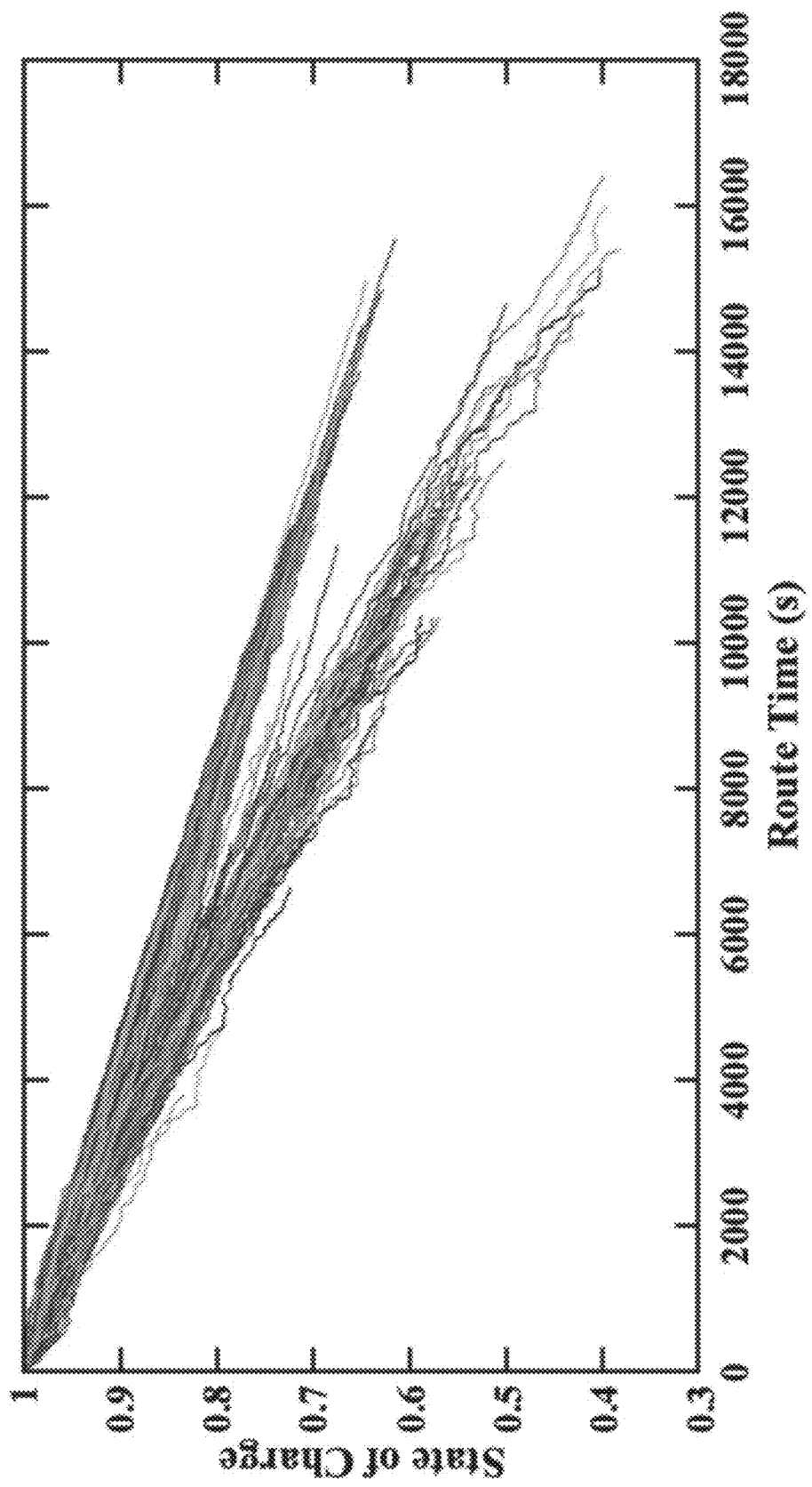
FIG. 12 is a graph showing the SoC trends for simulated trips of 1000 Tesla model threes showing that, despite random roots picked by each agent the trends exhibited a bimodal split.

Vehicle Fleet Case Study—To showcase the capabilities of the method of the invention to analyze fleets of vehicles, a case study was performed on 1000 Tesla Model 3s. These vehicles carry the same assumptions and characteristics as detailed in the previous section, however, in this case, rather than traveling on a fixed route, each vehicle is allowed to randomly pick both a starting point and an ending point and will travel the route determined by the A* algorithm between those two points. FIG. 10 shows the distribution in the distances traveled by the agents. As shown in the FIG. 10, a majority of the routes picked by the agents are less than 100 miles with an average route distance of 73.3 miles, although there are some agents that travelled large distances with the maximum route distance being 226.2 miles. As each agent traveled their respective route, they kept track of information such as the SoC depletion of the vehicle. The SoC trends of all of the agents is shown in FIG. 12. As seen in FIG. 12, there is a bimodal split in the SoC trends of the agents. When looking at the vehicles which have traveled more than 200 miles, there was a vehicle ending its route with 64.6% SoC after traveling 206.2 miles, which followed the SoC trend of the upper group. Another vehicle, however, ended its route with 38.4% SoC after traveling 212.7 miles, which followed the SoC trend of the lower group. Thus, two vehicles that had routes with over 200 miles to cover and differed in distance by only 6.5 miles ended their routes with a difference in their SoC of their respective batteries, of 26.2%, a difference which was almost entirely caused by differences in the environmental effects each vehicle experienced.

Figure 13:
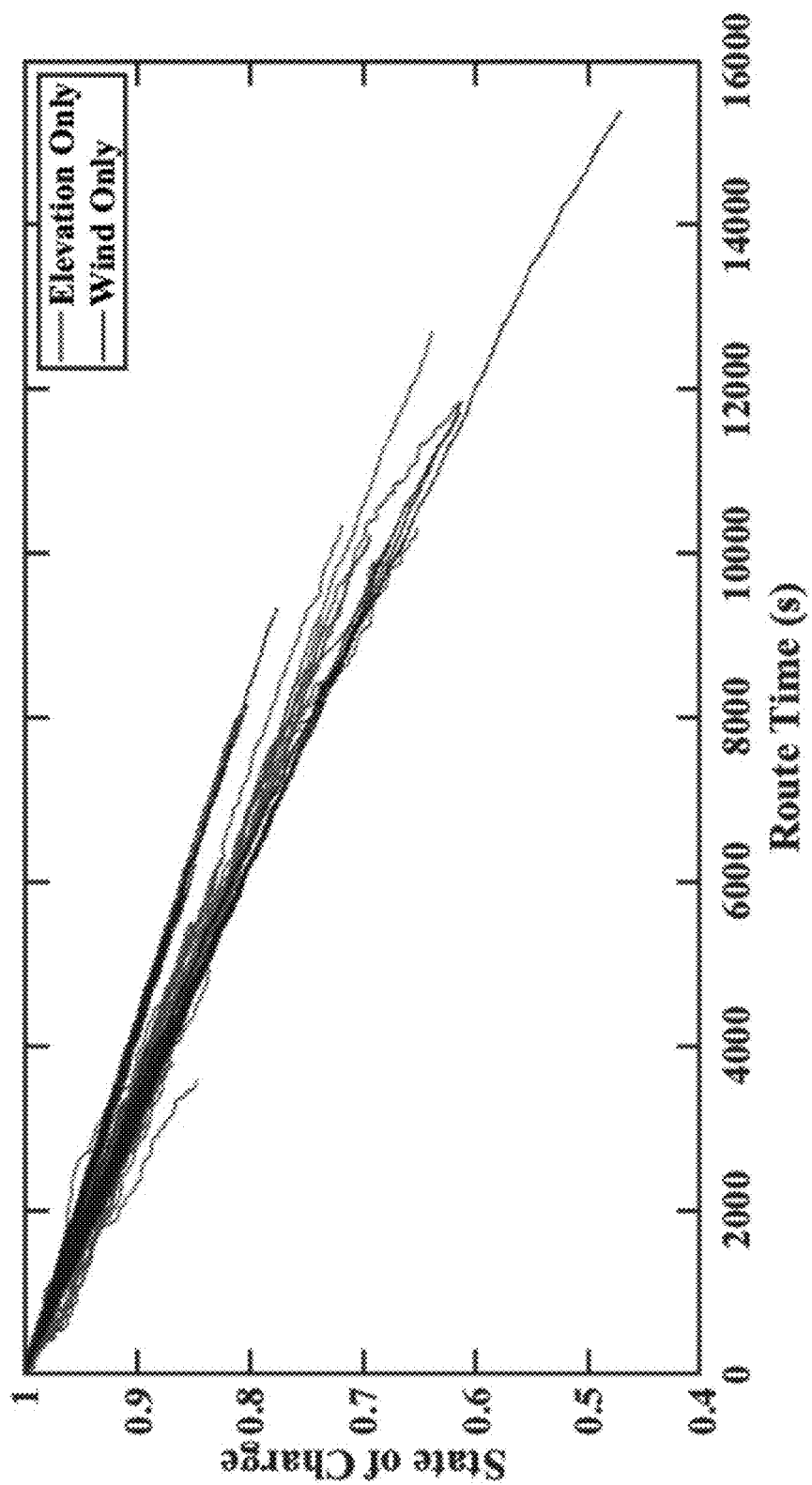
FIG. 13 is a graph showing the SoC trends for simulated trips of 100 Tesla model threes were 50 the vehicles had only the elevation effects and the other 50 had only wind effects, which suggests that the observed bimodal split is due to the wind effect while the spread along each of the split is due to the elevation effect.

Despite the fact that the agents were allowed to randomly chose their route, effectively allowing them to span the entirety of the Massachusetts highway system, the SoC depletion of any particular agent is likely to fall into one of these two possible groups, especially for larger routes. The question that remains, however, is what is the effect that caused the bi modal split? To answer this, a smaller fleet of 100 vehicles was simulated. However, for this simulation, 50 of the vehicles only had the elevation changes impact their power profile while the other 50 vehicles only had the wind impact their power profile. The SoC depletion curves for this simulation are shown in FIG. 13. As seen in the figure, the vehicles that only had elevation changes impact their power profiles tended to stay along one trajectory. However, the standard deviation of where the SoC is in that trajectory is much larger. On the other hand, the vehicles that only had the wind impact their power profiles had the bimodal split that was previously observed and the SoC profiles that followed those trajectories had a very tight standard deviation on the SoC at a given route time. Thus, it can be concluded that the bimodal split observed in FIG. 12 is due to the direction the vehicle is traveling, either with the wind or against it, while the standard deviation of the SoC along those two separate trajectories is due to the different elevation changes the vehicles experienced in their respective routes. It is important to note, however, that routes do exist which are traveling orthogonal or nearly orthogonal to the wind and thus lie in between the apparent bimodal split. These routes, due to the shape of Massachusetts, are much smaller and will end before the larger routes, which must be formed from some section of road which is predominately traveling either with the wind or against it, because the wind in this case is predominately blowing from west to east. Those shorter routes which could be traveling predominately northward or southward are what fill in the gap between the bimodal split for route times less than 8,000 seconds.

Therefore, the bimodal split is caused not only by the wind but also by the geometric constraints of the area. The wind effects are responsible for creating the two extremes, while the geometric constraints of the roads are responsible for the lack of SoC curves in between the two extremes beyond 8,000 seconds. This kind of simulation not only shows the capability for the method to keep track of the dynamics of multiple agents at once, but also demonstrates the large spread in SoC depletion trends due to the incorporation of environmental impacts into the vehicle and battery dynamics models which would, if using a black box calculation, be completely masked by a single SoC trend.

Figure 11:
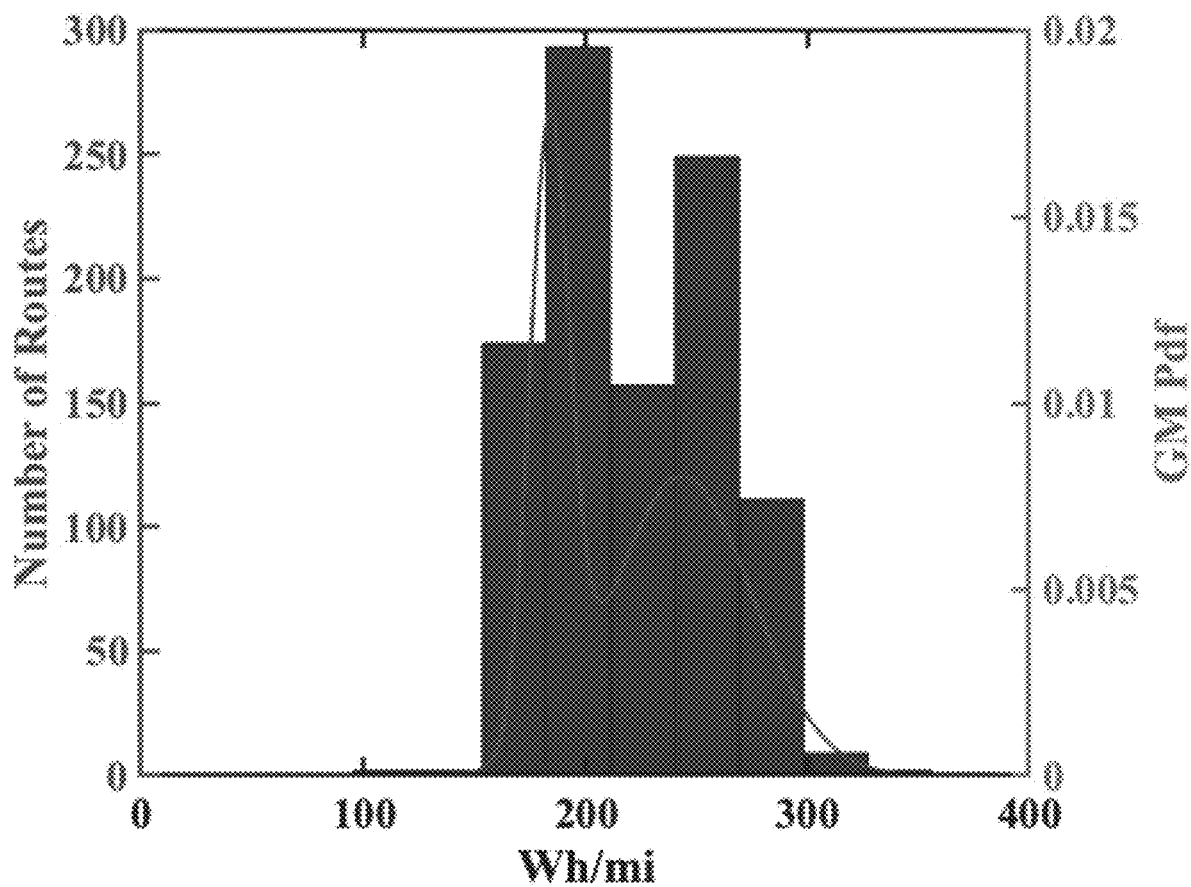
FIG. 11 is a histogram showing the distribution of energy usage per mile of 1000 simulated agents showing bimodal peaks.

Using the power profiles corresponding to each of those SoC trends, the energy used per mile traveled for each of the agents can be determined. The histogram for the Wh/mi of each of the agents is shown in FIG. 11, which shows that the energy usage per mile follows the same bimodal split that was previously discussed with respect to the SoC trend. Fitting a Gaussian Mixture model to the data with two distinct means to match the bimodal aspect of the data shows that the first peak occurs at 183.79 Wh/mi while the second peak occurs at 243.58 Wh/mi. Thus, Tesla Model 3s that travel with the wind, in this case, use on average about 60 Wh less per mile traveled. For a Tesla Model 3, this is a significant change in the energy usage per mile and could have major implications on the vehicle's ability to reach a charging station, if, for example, the charging stations are not deployed with these environmental impacts taken into consideration.

CONCLUSIONS

The method of the present invention combines Agent-Based Modeling with well-calibrated and tested vehicle and battery dynamics models while incorporating environmental and local effects to properly simulate electric vehicles and estimate their performance based on specific scenarios At an individual scale, the simulations demonstrate significant impacts that environmental conditions have on vehicles, causing, in this case, a differential of up to 30% in range traveled. The scale of the analysis can then be easily expanded to fleets of vehicles to provide statistics on the performance of the fleet which, in this case, has shown that the environmental effects combined with geometric restrictions due to the geography of the road network has led to a bimodality in the energy used per mile for the vehicles. This analysis has shown the importance of including the environment in the estimation of the performance of individual vehicles, which has further implications on the performance of the fleet and deployment of infrastructure needed to support that fleet. The method provides the ability to perform this in-depth analysis at both the individual vehicle and fleet scale and provides the crucial information needed to properly analyze the fleet and make decisions such as where to place the charging stations. Furthermore, the method is capable of providing this analysis for any location using freely available data and can seamlessly integrate into many different large simulations needing either individual vehicle or fleet scale data, while also being able to incorporate the many different models needed to simulate the different types of vehicles and batteries.

The invention has been described in terms of specific implementations. As would be realized by one of skill in the art, the various specific and limitations are provided as exemplary implementations, modifications of which are still intended to be within the scope of the invention. For example, sources of data used in the simulations, such as map data, environmental data, etc., may be obtained in any form from any source. Likewise, the map of the target area is not limited to storage in a plurality of matrices but may be stored in any convenient way. Specific methods of formatting and converting the data for use in the simulations should be considered exemplary in nature and variations are still within the scope of the invention. Similarly, the method of performing the vehicle simulations should be considered exemplary in nature, variations of which are also intended to be within the scope of the invention.

The invention claimed is:

1. A method comprising:
   generating a map of a target area, the map comprising one or more nodes, each node corresponding to a geographic portion of the target area, each node containing one or more characteristics of the portion of the target area to which it corresponds;
   simulating a plurality of trips of a plurality of simulated electric vehicles through the target area, each of the plurality of electric vehicles having a battery, each simulation comprising:
      determining a route for the simulated trip, the route comprising a series of nodes from the map;
      for each current node in the route:
         determining a power profile required for the vehicle to move from a previous node to the current node;
         determining depletion of the battery from the previous node to the current node based on the determined power profile;
         determining if a state of charge of the battery falls below a predetermined threshold and, if so, determining the nearest node comprising a charger location;
         ending the simulation when the state of charge falls below the predetermined threshold or when the vehicle reaches an end node in the route.

2. The method of claim 1 wherein the map comprises one or more matrices, each cell in each matrix corresponding to a node in the map, each cell in each matrix containing data representing at least one of the one or more characteristics.

3. The method of claim 1 wherein nodes in the target area which do not contain or are not part of a road are ignored for purposes of the plurality of simulated trips.

4. The method of claim 1 wherein the power profile required for the vehicle to move from the previous node to the current node is extracted from a power profile for the entire trip.

5. The method of claim 1 further comprising:
   determining a distance travelled as the vehicle moves from the previous node in the route to the current node in the route;
   determining a velocity profile of the vehicle as it moves from the previous node to the current node;
   determining the power profile required for the vehicle to move from the previous node to the current node, the power profile based on the distance travelled and the velocity profile.

6. The method of claim 5 wherein the velocity profile required for the vehicle to move from the previous node to the current mode is extracted from a velocity profile for the entire trip.

7. The method of claim 1 wherein the one or more characteristics of each node comprise the location of the node and environmental conditions at the node.

8. The method of claim 5 wherein the one or more characteristics of each node comprise traffic information and further wherein the velocity profile of the vehicle as it moves from the previous node to the current node is dependent upon the traffic information.

9. The method of claim 7, wherein the environmental conditions comprise wind speed, wind direction, elevation and temperature.

10. The method of claim 1 wherein the route comprises a start node and an end node.

11. The method of claim 10 wherein the start node and the end node are selected at random or based on the sampling of the distribution.

12. The method of claim 11 wherein the route is determined using a routing algorithm.

13. The method of claim 1 wherein the power profile is determined by a vehicle dynamics model.

14. The method of claim 13 wherein the vehicle dynamics model is specific to a vehicle type and is customized by parameters specifying characteristics of a particular vehicle.

15. The method of claim 14 wherein the parameters specifying characteristics of the particular vehicle are user-supplied values or are sampled from a distribution.

16. The method of claim 9 further comprising:
   determining a positive or negative wind component in the direction of travel of the vehicle based on the wind speed and the wind direction stored for the current node in the route; and
   adjusting the power profile required for the vehicle to move from the previous node to the current node based on the wind component.

17. The method of claim 9 further comprising:
   determining a positive or negative elevation change from the previous node in the route to the current node in the route; and
   adjusting the power profile required for the vehicle to move from the previous node to the current node based on the elevation change.

18. The method of claim 9 wherein the depletion of the battery is determined by a battery dynamics model.

19. The method of claim 18 wherein the depletion of the battery for the current node is determined as a function of the temperature at the current node.

20. The method of claim 1, wherein the resolution of the nodes is set by a user-supplied variable.

21. The method of claim 7, wherein the one or more characteristics of each node further comprises whether the node is a charger location.

22. The method of claim 21 wherein the node is a charger location if the node currently contains one or more electric chargers or is identified as a possible location for one or more electric chargers.

23. The method of claim 21 further comprising:
   determining the total number of trips from the plurality of simulated trips for which each node identified as a charger location was a closest node to the vehicle when the state of charge of the battery of the vehicle dropped below the threshold.

24. The method of claim 23 further comprising:
   determining a predetermined number of nodes having the highest total number of trips; and
   identifying the predetermined number of nodes as possible locations for charger deployment.

25. The method of claim 1 wherein the initial state of charge of the battery for each simulated trip is set to a random value.

26. The method of claim 1 wherein the initial state of charge of the battery for each simulated trip is set by sampling a distribution.

27. The method of claim 1 wherein a subset of the plurality of simulated trips are run in parallel.

28. The method of claim 27 wherein the subset of the plurality of simulated trips are run on multiple cores either on the same processor or different processors wherein one core manages a plurality of agents running in the remaining cores, each agent simulating one of the plurality of electric vehicles traversing one of the plurality of simulated trips.

29. The method of claim 1 further comprising:
creating fleet statistics specifying the performance of a fleet of electric vehicles comprising the plurality of simulated electric vehicles.

30. The method of claim 1 wherein the number of simulated trips is a user-supplied parameter.

31. The method of claim 1 further comprising:
determining that the state of charge of the battery has fallen below a low state of charge threshold; and
tracking a number of times the current node contains a vehicle that has fallen below the low state of charge threshold; and
identifying as low state of charge hotspots those nodes having the highest number of times the node contained a vehicle that fell below the low state of charge threshold.

* * * * *